(12) United States Patent
Wolpoff et al.

(10) Patent No.: US 11,444,968 B1
(45) Date of Patent: Sep. 13, 2022

(54) DISTRIBUTED SYSTEM FOR AUTONOMOUS DISCOVERY AND EXPLOITATION OF AN ORGANIZATION'S COMPUTING AND/OR HUMAN RESOURCES TO EVALUATE CAPACITY AND/OR ABILITY TO DETECT, RESPOND TO, AND MITIGATE EFFECTIVENESS OF INTRUSION ATTEMPTS BY, AND RECONNAISSANCE EFFORTS OF, MOTIVATED, ANTAGONISTIC, THIRD PARTIES

(71) Applicant: Randori Inc., Waltham, MA (US)

(72) Inventors: David Wolpoff, Denver, CO (US); Eric McIntyre, Vancouver, WA (US); Evan Anderson, Highlands Ranch, CO (US)

(73) Assignee: Randori, Inc., Waltham, MA (US)

( * ) Notice: Subject to any disclaimer, the term of this patent is extended or adjusted under 35 U.S.C. 154(b) by 402 days.

(21) Appl. No.: 16/783,136

(22) Filed: Feb. 5, 2020

Related U.S. Application Data

(60) Provisional application No. 62/801,778, filed on Feb. 6, 2019, provisional application No. 62/900,847, filed on Sep. 16, 2019, provisional application No. 62/955,724, filed on Dec. 31, 2019.

(51) Int. Cl.
*G06F 9/50* (2006.01)
*H04L 9/40* (2022.01)

(52) U.S. Cl.
CPC ........ *H04L 63/1433* (2013.01); *G06F 9/5011* (2013.01); *G06F 2209/5011* (2013.01)

(58) Field of Classification Search
CPC .................................................... G06F 9/5011
See application file for complete search history.

(56) References Cited

U.S. PATENT DOCUMENTS 11,275,843 B2 * 3/2022 Kassoumeh ....... G06Q 10/0635
2017/0195349 A1 * 7/2017 Shabtai ............... H04L 63/1433

* cited by examiner

*Primary Examiner* — Charlie Sun
(74) *Attorney, Agent, or Firm* — Brownstein Hyatt Farber Schreck, LLP

(57) ABSTRACT

A system and method for performing autonomous analysis of computing resources of a particular entity across the open internet. In particular, a modularized system that is configured to distribute work to ephemeral worker nodes in order perform a blackbox analysis of a target entity and various computing resources under the control or administration of that entity. The blackbox analysis includes an evaluation of discovered resources and services based on appeal or threat actor temptation heuristic.

20 Claims, 12 Drawing Sheets

DISTRIBUTED SYSTEM FOR AUTONOMOUS DISCOVERY AND EXPLOITATION OF AN ORGANIZATION'S COMPUTING AND/OR HUMAN RESOURCES TO EVALUATE CAPACITY AND/OR ABILITY TO DETECT, RESPOND TO, AND MITIGATE EFFECTIVENESS OF INTRUSION ATTEMPTS BY, AND RECONNAISSANCE EFFORTS OF, MOTIVATED, ANTAGONISTIC, THIRD PARTIES

CROSS-REFERENCE TO RELATED APPLICATION(S)

This application is a nonprovisional of, and claims the benefit under 35 U.S.C. § 119(e) of, U.S. Provisional Patent Application No. 62/801,778, filed on Feb. 6, 2019, and entitled "Autonomous Discovery and Selective Exploitation of Computing And Human Resources for Evaluating Preparedness for Attacks By Third Parties," and U.S. Provisional Patent Application No. 62/900,847, filed on Sep. 16, 2019, and entitled "Constraint Schema to Inform Workload Placement and/or Provisioning and Retirement of Worker Nodes in a System Configured to Evaluate Preparedness of an Organization to Attacks by Third Parties," and to U.S. Provisional Patent Application No. 62/955,724, filed on Dec. 31, 2019, and entitled "Autonomous Determination of Characteristic(s) and/or Configuration(s) of a Remote Computing Resource to Inform Operation of an Autonomous System Used to Evaluate Preparedness of an Organization to Attacks or Reconnaissance Effort by Antagonistic Third Parties, the contents of which are incorporated by reference in their entirety.

TECHNICAL FIELD

Embodiments described herein relate to systems and methods for evaluating effectiveness of computer and network security measures.

In particular, embodiments described herein relate to distributed event-driven systems of physical and/or virtual machines that facilitate autonomous discovery and selective exploitation of one or more computing or human resources in order to evaluate (1) an ability and/or (2) a capacity of persons or entities charged with protecting such resources to (a) detect, (b) respond to, and/or (c) mitigate effectiveness of (and/or damage or information loss resulting from) intrusion attempts by and reconnaissance efforts of motivated, antagonistic, third parties.

BACKGROUND

A business organization or government entity may restrict access to a computing device or system by deploying one or more software or hardware security controls configured to prevent unauthorized access by third parties. Such organizations often rely on third-party vendors to (1) design and deploy appropriate security controls and (2) to provide periodic analysis verifying whether previously-deployed security controls continue to satisfy industry-standard tests. As a result of these market forces, a strong incentive exists for vendors to design security controls primarily to pass these industry-standard tests.

Problematically, however, industry-standard tests naturally lag behind state-of-the-art techniques leveraged by antagonistic third parties (including hostile nation states, cause actors, vigilante groups, cyber criminals, and vandals) who continuously, both collectively and independently, research and develop new software, hardware, and social exploit techniques specifically to circumvent security controls of targeted organizations.

As a result, business organizations, government entities, and/or data breach insurance agencies that directly or indirectly rely on third-party vendors to supply, deploy, and test security controls often adopt the false impression that their security controls are, and will remain, sufficient to prevent from all or substantially all intrusion attempts or reconnaissance efforts by antagonistic third parties.

SUMMARY

Embodiments described herein reference systems and methods for distributing work associated with blackbox analysis of an entity (e.g., such as a corporation or individual) and one or more computing and/or human resources under the control of that entity or individual. More specifically, embodiments described herein reference systems and methods for leveraging a pool of ephemeral nodes to perform computational work in a distributed manner.

Embodiments described herein may relate to, include, or take the form of a distributed system for remote discovery and remote evaluation of a vulnerability presented by an instance of software executed by a computing resource. The distributed system of many embodiments includes a service referred to herein as a "workload manager" that is configured to receive (as input) a data item associated with an entity that administers at least one Internet-connected computing resource. Upon receiving the data item (e.g., email address, phone number, domain name, and so on), the workload manager advances to generate a reconnaissance plan based on the data item. The reconnaissance plan is defined by or as a set of jobs, each job defining at least one computational task that advances some aspect of the reconnaissance plan.

The system further includes a pool of worker node instances, each worker node instance is configured to receive one respective job of the set of jobs and is further configured to execute each respective computational task defined by the associated job. In this manner, the operations of the reconnaissance plan can be performed in a massively parallel and geographically distributed manner, thereby reducing a likelihood that performance of the reconnaissance plan is not detected or otherwise distinguishable from expected internet traffic.

The system additionally includes a data aggregator configured to (asynchronously, in many embodiments) receive, and to aggregate, data resulting from execution of one or more jobs by one or more worker nodes. In addition, the system includes a data processor configured to receive, from the data aggregator, aggregated data with which the data processor may be configured to identify at least one computing resource likely administered by the entity. For each respective computing resource, the data processor can be configured to: identify an instance of software executed by the computing resource; identify a vulnerability presented by the instance of software; and to generate or update an appeal score based at least in part on the vulnerability. In these and other embodiments, the appeal score corresponds to a prediction of attractiveness of the a given computing resource or vulnerability to an exploitation attempt by a third party. In many embodiments, computing resources can be sorted and/or displayed in an order defined by appeal scores.

Some embodiments described herein may relate to, include, or take the form of a method for remote discovery and evaluation of Internet-connected computing resources administered by an entity, the method including operations of: receiving as input a data item associated with the entity; generating a reconnaissance plan based on the data item, the reconnaissance plan including a set of jobs, each job defining at least one computational task.

The method advances by, either iteratively or recursively: assigning each respective job to a respective ephemeral worker node; aggregating data resulting from execution of each respective job; identifying, with the aggregated data, a computing resource likely administered by the entity; identifying, with the aggregated data, an instance of software executed by the computing resource; identifying, with the aggregated data, a vulnerability presented by the instance of software; and, with the aggregated data, updating an appeal score of the computing resource, the appeal score corresponding to a prediction of attractiveness of the computing resource and vulnerability to an exploitation attempt by a third party, and updating the reconnaissance plan based on the appeal score. In some examples, some or all worker nodes may be decommissioned and discarded upon successful execution of its respective assigned job.

Embodiments described herein may relate to, include, or take the form of a method for presenting and ranking results of a remote discovery and evaluation operation enumerating computing resources of an entity, the method including operations of: receiving, at a user interface, a data item identifying the entity; generating a reconnaissance plan with a set of jobs based on the data item.

The method advances by, iteratively or recursively: assigning each respective job to a respective worker node selected from a pool of geographically distributed instantiated worker nodes; receiving data resulting from each execution of each respective job; identifying a computing resource likely administered by the entity; identifying an instance of software executed by the computing resource; identifying a vulnerability presented by the instance of software; and updating or creating an appeal score of the computing resource, the appeal score corresponding to a prediction of attractiveness of the computing resource and vulnerability to an exploitation attempt by a third party. The method further includes operations of: updating the reconnaissance plan based on the appeal score; and updating the user interface to display information related to at least a subset of identified computing resources, in descending order of appeal score.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
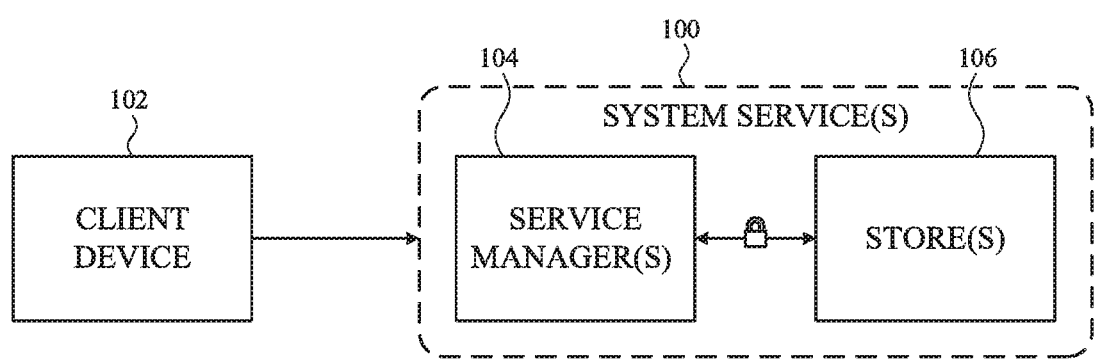
FIG. 1 depicts a schematic representation of a system for automated discovery and selective exploitation of computing devices and networks, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference distributed event-driven systems that operate by instantiating a number (herein, a "pool") of ephemeral/disposable virtual machines (herein, "worker nodes"), via one or more cloud providers in one or more geographical locations, that have access to the open Internet. Each instantiated worker node of can submit requests and receive responses (e.g., via HTTP, TCP, and so on) via the open Internet. These worker nodes can each be assigned discrete items of work, the results of which inform one or more aspects of a single common reconnaissance objective designed to obtain and aggregate information about a particular Internet-connected computing resource, such as a webserver. As a result of the distributed nature of the total work performed, the targeted computing resource is unlikely to sense or detect any abnormal activity.

Once a quantity of information about the targeted computing resource is aggregated (e.g., by collecting results of work performed by individual worker nodes), the system may be configured to analyze those results to enumerate (or predict beyond a selected threshold confidence) specific features, properties, or characteristics of the targeted computing resource, such as hardware type and version, software type and version, and so on.

Once a quantity of features, properties, or characteristics are enumerated, the system can determine whether (1) the targeted computing resource exhibits a known vulnerability (which may be associated with a detectability score, a simplicity/complexity score, or other suitable characterization data) that can be executed via the open Internet by one or more worker nodes and/or (2) a likelihood that the targeted computing resource, if exploited by executing one or more determined vulnerabilities, could be used to obtain additional information and/or whether the targeted computing resource is communicably coupled to additional computing resources owned, operated, or otherwise under the control of the same individual or entity as the targeted computing resource.

The systems described herein can be further configured to analyze, with respect to a given targeted computing resource, (1) all aggregated information, (2) all known or predicted features, properties, or characteristics, (3) all known vulnerabilities (including detectability scores, simplicity/complexity scores, and so on), (4) predicted likelihood(s) of additional information/computing resources associated with one or more successfully executed vulnerabilities, and (5) any additional data however acquired or input to generate a score representing or characterizing how attractive the targeted computing resource would be to the attention of a motivated antagonistic third party. Such a score can be referred to herein as an "appeal score" or an "attractiveness score."

For embodiments described herein, the above-described operations can be repeated, whether in parallel or in a sequence, against any arbitrary number of computing resources accessible via the open internet. In such examples, the appeal/attractiveness scores assigned to different targeted computing resources can be used to inform additional operations. For example, targeted computing resources with high appeal/attractiveness scores (e.g., satisfying a threshold) may be the subject of additional reconnaissance effort such the more information about those resources can be obtained. In other examples, targeted computing resources with low appeal/attractiveness scores may be ignored despite that such devices may exhibit known vulnerabilities. In another, non-limiting phrasing, a high appeal/attractiveness score may indicate that a particular computing resource or software executed by that computing resource exhibits a vulnerability attractive to a motivated antagonistic third party. More simply, a high appeal/attractiveness score may indicate an "attractive vulnerability" whereas a low appeal/attractiveness score may indicate a "neutral vulnerability" or an "unattractive vulnerability."

In some embodiments, a system such as described herein can be configured to execute one or more identified exploits taking advantage of one or more known vulnerabilities upon receiving permission or authorization. In these examples, once a computing resource has been exploited (e.g., arbitrary computer code can be executed on, or by, the computing resource), a system such as described herein can be configured to treat the exploited computing resources as a worker node, assigning it work to be performed. In many embodiments, an exploited computing resource may be able to communicate with other computing resources not accessible via the open Internet. In such examples, as described herein, the exploited computing resource enjoys a different "perspective" than general worker nodes; an exploited computing resource may be able to "see" or communicate with devices that a general worker node cannot. As such, for many embodiments described herein, work may be assigned to worker nodes (including exploited computing resources) based on a "perspective" enjoyed by that particular worker node.

Leveraging the above-described and other herein described techniques, a system such as described herein can be configured to iteratively build a mathematical graph of communicably coupled (or otherwise interconnected) computing resources associated with a specific individual, organization, or government entity. As noted above, the various nodes of the graph (corresponding, in many embodiments, to individual computing resources) can be ranked, sorted, or otherwise leveraged based on appeal/attractiveness scores.

Phrased in view of another, non-limiting context, a system such as described herein can receive, as input, an individual's name or organization's name. With this information, the system can assign one or more worker nodes a work item to identify one or more internet-connected devices (e.g., servers), services (e.g., domain names), and/or identities (e.g., social media profiles/accounts) likely associated with that name. Once such information is received, additional work can be assigned to the same or different worker nodes to resolve domain names to IP addresses, perform reverse DNS lookups, obtain WhoIs information, and so on. Once such information is received, additional work can be assigned to obtain/aggregate information or data describing each IP address (e.g., open ports, closed ports, uniform resource locations anchored to other websites, loading of remote resources, references to other servers or services, server software type and version, latencies, and so on). Subsequently discovered IP addresses can be further processed in the same manner. These processes can continue recursively, iteratively, or otherwise. The discovery of resources logically and/or communicably linked with one another and under the control of the input individual/organization can be terminated in response to a number of suitable events such as, but not limited to: the system reaching a target graph depth; the system reaching a target node count; the system reaching a target edge count; in response to an instruction from an operator of the system and so on. In other cases, information gathering operations may continue ad infinitum. As such processes are ongoing, the system may be further configured to enumerate features of each discovered computing resource and so on in order to calculate or otherwise determine an appeal score for each discovered computing resource. Thereafter, the system may be configured to sort discovered computing resources based on each respective appeal score. In some embodiments, the highest appeal scores (e.g., a selected subset of computing resources with high appeal) may be exploited and leveraged as worker nodes having a different perspective. In addition, these exploited devices may be examined to determine whether additional information may be extracted therefrom (e.g., confidential information, network information, software or hardware information, and so on). Thereafter, the above-described operations can continue, leveraging a new perspective. Results of these and any of the above-described operations can be displayed in a graphical user interface that can inform the individual or organization which computing resources under its control are the most likely (i.e., the most appealing) to be targeted by a motivated and financially supported antagonistic third party.

As a result of these described architectures, security researchers, penetration testers, red team specialists, and other network security professionals may devote time and talent to the development of workloads that may be performed by a worker node, such as described herein.

In view of the foregoing, more generally and broadly, embodiments described herein relate to an autonomous system that recursively (or iteratively), using the open Internet, generates a graphical representation of a computer network operated by a specified individual or organization. The nodes of the graph correspond to individual computing resources that are sorted and/or selectively exploited based on a predicted appeal to an antagonistic third party. As a result of this architecture, business organizations and individuals charged with protecting computing resources can readily understand which security weaknesses should be fixed first and which security weaknesses should be deprioritized. In other words, embodiments described herein empower decision-makers, including nontechnical decision-makers, to understand highly technical information security weaknesses.

In many embodiments, recommendations made by the system and/or appeal scores can be biased based on a selected sophistication of a hypothetical antagonistic third party. For example, appeal scoring may be different for a cause actor (who may prioritize website defacement and thus may find webservers very attractive) than a nation state (who may prioritize information exfiltration and thus may find webservers unattractive). As a result, systems described herein can be configured to present information and/or recommendations regarding network security that is keyed to specific types of antagonistic third parties. This may be particularly useful to different industries; a first industry may generally prioritize preventing website defacement whereas a second industry may generally prioritize preventing information breaches over all else. In other words, embodiments described herein empower decision-makers, including nontechnical decision-makers, to understand network security risks in view of a number of business objectives and goals.

These and other embodiments described herein are understood to operate in a substantially or completely autonomous manner and are configured to perform items of work in a distributed way that minimizes or eliminates any risk that a targeted organization or individual successfully detects and/or prevents operation(s) of the system. For example, items of work targeting a particular computing resource may be fragmented across multiple geographically distributed worker nodes instantiated through different cloud service providers in different jurisdictions or locations such that action(s) of the group of worker nodes is indistinguishable from ordinary and expected Internet traffic. In some examples, operation(s) of one or more worker nodes may be throttled to execute at random intervals or at specific times of the day or night, further obfuscating operations of the system.

More generally and broadly, embodiments described herein reference systems and methods for automatically obtaining, parsing, processing, and/or aggregating (herein, for simplicity, "obtaining") information and/or data, from any suitable source that relates to, or otherwise concerns a particular or specified entity, organization, or individual (herein, for simplicity, an "entity"). For simplicity of description, this process or operation is referred to herein as "entity reconnaissance" of a "target entity."

In many embodiments, a target entity is selected by the entity itself, or a representative, officer, or agent of the entity, (collectively, for simplicity, a "representative") by providing input to a system, such as described herein. For example, in many embodiments, a representative of an entity can access an Internet service, form, or page hosted a system, such as described herein, to provide input that positively or inferentially identifies the target entity and authorizes the system to engage with the target entity and/or property or human resources of the target entity, such as a computing or human resource under the control of the target entity. For simplicity of description, this process or operation is referred to herein as "identification" of a "target entity."

Example input that can be provided to a system, such as described herein, by a representative of a target entity to positively or inferentially identify a target entity can include, but may not be limited to: an email address; a phone number; a company name; a company registration number; a corporate officer name; an employee name; a company website; and the like. It may be appreciated that the foregoing examples are not exhaustive.

Example sources that can be accessed by a system, such as described herein, to obtain information concerning a target entity by performing an entity reconnaissance operation, such as described herein, can include, but may not be limited to: publicly accessible databases; private or third-party databases; a website of the target entity; social media services or pages; open source intelligence resources; directory services; government databases; domain name system services; and so on. It may be appreciated that the foregoing examples are not exhaustive.

Example information concerning a target entity that is a computing resource that can be obtained by performing an entity reconnaissance operation, such as described herein, can include, but may not be limited to: a domain name; an email address; a virtual host; a subdomain associated with a domain name; a telephone number; an Internet service provider of the associated the target entity; a certificate and/or certificate authority associated with a domain name; a browser or device used by an individual associated with the target entity; and the like. It may be appreciated that the foregoing examples are not exhaustive.

Example information concerning a target entity that is a human resource that can be obtained by performing an entity reconnaissance operation, such as described herein, can include, but may not be limited to: an email address; a title; a name; a birthdate; family information; role information; department or organizational responsibility information; social media information; address information; social network information; professional network information; educational background; and the like. It may be appreciated that the foregoing examples are not exhaustive. For simplicity of description, many embodiments that follow reference a target entity that is a computing resource; however, it may be appreciated that this is merely one example and other types of target entities, including human resources (e.g. employees, staff, contractors, executives, vendors, and so on), may also be target entities such as described herein.

Typically, entity reconnaissance, such as described herein, can be carried out in whole, or in part, across the open Internet and/or via one or more alternative communication channels, protocols, or services otherwise available to, or accessible by, the public at large (also referred to as "open" resources). For simplicity of description, this constraint is generally referred to herein as conducting entity reconnaissance of a target entity from a public "perspective."

As used herein, the term "perspective" refers to a set of potential target entities, whether those entities are associated with computing resources or human resources, with which a target entity can communicate. For example, a computing resource may be a server hosting a website accessible to the open internet. The server may also be coupled to a private network, not accessible to the open internet, that facilitates communication between the server and a private database. In this example, the server is visible from a public perspective, but the database is not. Instead, the database is visible only from the perspective of the server itself.

Additional embodiments described herein reference systems and methods for obtaining information concerning one or more computing resources that are determined to be controlled, managed, supervised, operated, leased, owned, affiliated with, or otherwise associated with (herein, for simplicity, "controlled by"), a target entity. For simplicity of description, this process or operation is referred to herein as "resource discovery."

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange, voice-over internet protocol hosts and controllers, end-user terminals, and the like); personal electronic devices and systems and components thereof (e.g., cellular phones, tablet computers, desktop computers, laptop computers); and so on. It may be appreciated that the foregoing examples are not exhaustive.

Example information concerning a target entity that can be obtained by performing a resource discovery operation, such as described herein, can include, but may not be limited to: an internet protocol ("IP") address; a geographic location of an IP address; a computing resource hosting, or otherwise associated with, a webpage or content displayed on or served by a webpage; a computing resource having a particular IP address; a computing resource having an IP address within a particular IP address range; a manufacturer of a specified computing resource; a manufacturer of a network interface card or controller associated with a computing resource; a fingerprint of a computing resource; and the like. It may be appreciated that the foregoing examples are not exhaustive.

In many embodiments, similar to other operations described herein, a resource discovery operation can be carried out in whole, or in part, from a public perspective via the open Internet.

Additional embodiments described herein reference systems and methods for obtaining information concerning one or more "services" provided, administered, hosted, or otherwise made available or accessible by (herein, for simplicity, "hosted by"), whether intentionally or unintentionally, a particular computing resource controlled by a target entity. As used herein, the phrase "service" refers to a particular version of a hardware-implemented or software-implemented function that implements or performs a known functionality or conforms to a known private or public communication or data transaction protocol. A particular instance of a service on a particular computing resources is referred to herein as an "instantiated service," a "technical target," or as a "target."

For example, a particular machine at a particular IP address may have installed a service of "Windows XP, build 5.1.2600." In this example, Windows XP, build 5.1.2600 is referred to as the service, the particular machine is referred to as a target entity and/or a computing resource, and the physical installation of Windows XP, build 5.1.2600 onto the particular machine is referred to as the instantiated service or the target.

In view of the foregoing, the process or operation of discovering one or more services that are provided by a particular computing resource is referred to herein as "service discovery" or "service enumeration."

Example information concerning a specified computing resource that can be obtained by performing a service discovery operation, such as described herein, can include, but may not be limited to: open or closed ports; supported or unsupported communication protocols (e.g., Secure Shell, Telnet, Simple Network Management Protocol, Hypertext Transfer Protocol, Secure Hypertext Transfer Protocol, Real Time Streaming Protocol, Simple Mail Service Protocol, Internet Message Access Protocol, Transmission Control Protocol, User Datagram Protocol, Transport Layer Security Handshake Protocol, and the like); an operating system type, version, vendor, and so on resident on the computing resource; request headers; server software vendor and/or version; enabled server software feature set; Secure Shell banner messages; supported or unsupported encryption; and so on. It may be appreciated that the foregoing examples are not exhaustive.

In many embodiments, similar to other operations described herein, a service discovery operation can be carried out in whole, or in part, from a public perspective.

Additional embodiments described herein reference systems and methods for obtaining information concerning one or more "capabilities" of a human resource associated with a target entity. As used herein, the term "capabilities" refers to a particular responsibility (e.g., job title, description, and so on), task, or role that can be undertaken by a particular individual and any and all associated permissions or privileges that may be associated therewith including, but not limited to, physical or permissioned access to one or more computing resources or networks. Example capabilities include, but may not be limited to: physical access to a computing resource; ability to request physical access to a computing resource; social or professional connection to another human resource with one or more capabilities; ability to send or receive email at a particular email address; physical or permissioned access to access a database; and so on. As with services, capabilities of a human resource can be discovered and/or enumerated in an autonomous or automated fashion.

In many embodiments, similar to other operations described herein, a capability discovery operation can be carried out in whole, or in part, from a public perspective.

Additional embodiments described herein reference systems and methods configured to automatically perform a heuristic analysis of one or more discovered services of a particular computing resource (and/or capabilities of a human resource) in order to tag, categorize, organize, score, value, grade, sort, and/or prioritize those discovered services based on a predicted appeal of each service to the attention of an third party, also referred to as a "threat agent." For simplicity of description, this process or operation is referred to herein as "appeal scoring" or "temptation scoring" based on an "appeal heuristic."

In these examples, a system such as described herein can be configured to evaluate whether any instantiated service of any discovered computing resource of a target entity is vulnerable to exploitation. In other words, systems describe herein are configured to autonomously evaluate whether a computing resource includes a "vulnerability." This term is used herein to refer to a potential security weakness of a particular computing resource that may be leveraged using a publicly or privately known "exploit" to execute arbitrary computer program code on the computing resource. Similarly, systems described herein can be configured to evaluate whether any human resource of a target entity is susceptible to be "induced" or "recruited" to, voluntarily or unknowingly, perform one or more tasks on behalf of the system. (e.g., phishing, whaling, and so on).

Examples concerning an appeal scoring operation, such as described herein, can include, but may not be limited to: increasing an appeal score upon determining that a discovered service exhibits a vulnerability that can be exploited by a publicly or privately known method; decreasing an appeal score upon determining that a discovered service does not exhibit a publicly or privately known vulnerability; increasing an appeal score upon determining that a discovered service or a discovered computing resource is likely to be communicably coupled to a database or another computing resource; decreasing an appeal score upon determining that a discovered service or a discovered computing resource is likely supported by a control, such as a firewall or intrusion detection apparatus; increasing an appeal score upon determining that a discovered service or a discovered computing resource is likely used to store, to be able to obtain, and/or to gate access to confidential information and/or real or personal property; increasing an appeal score upon determining that a discovered service is presented in a particular manner typically associated with an unsophisticated implementation (e.g., a web page presented without aesthetic styling, a manually coded or edited web page, a web page presented without mobile device rendering support, and the like); and so on. As with other embodiments described herein, the appeal scores may serve as a proxy to and/or may indicate which vulnerable computing or human resources are attractive, neutral, or unattractive. It may be appreciated that the foregoing examples are not exhaustive.

Further examples concerning an appeal scoring operation, such as described herein, can include, but may not be limited to: increasing an appeal score upon determining that a human resource is a member of a group of employees in a particular department of a target entity (e.g., marketing, human resources, information technology, legal, engineering, maintenance, and so on); changing an appeal score upon determining that a human resource is an executive of a target entity; changing an appeal score upon determining that a human resource is a contactor of a target entity; increasing an appeal score upon determining that a human resource uses a particular email address or username in one or more publicly-accessible forums; increasing an appeal score upon determining that a human resource is a likely to be responsive to an email or telephone call from an unknown third party; and so on. These and other appeal scores, as noted above, can serve to separate attractive vulnerabilities from neutral or unattractive vulnerabilities.

In many embodiments, similar to other operations described herein, an appeal scoring operation, whether associated with a computing or human resource, can be carried out in whole, or in part, from a public perspective.

Additional embodiments described herein reference systems and methods configured to automatically execute an exploit of a vulnerability, whether publicly known or privately known and undisclosed, of an instantiated service of a particular computing resource to cause that computing resource to exhibit unintended behavior. Still further embodiments described herein reference systems and methods configured to automatically execute a task to recruit a human resource of a target entity to induce the human resource to perform an unintended task.

In other embodiments, systems and methods described herein are configured to execute an exploit of a known vulnerability of a selected service of a particular computing resource or, additionally or alternatively, a recruitment of a human resource, only after receiving affirmative input from an authorized representative of the target entity.

Examples of unintended behavior of a computing resource that can be caused by executing an exploit of a privately-known or publicly-known vulnerability include, but are not limited to: executing arbitrary computer program code or instructions; transferring or communicating data; writing data to volatile or non-volatile memory; discontinuing one or more services hosted by the computing resource; communicably coupling to, or decoupling from, another system or computing resource; shutting down; restarting; operating outside of ordinary parameters (e.g., over or under-clocking, operating under high-temperature conditions, and the like), and so on. It may be appreciated that the foregoing examples are not exhaustive.

Examples of unintended tasks performed by a recruited human resource include, but are not limited to: executing arbitrary computer program code or instructions on a particular computing resource or network; transferring or communicating data (e.g., via email, phone, or other communication methodology) to a third party; discontinuing one or more services or changing a power state or availability of a computing resource; communicably coupling to, or decoupling from, another system or computing resource; and so on. It may be appreciated that the foregoing examples are not exhaustive.

For simplicity of description, a computing resource that has been successfully exploited (e.g., by delivering an "exploit" to that computing resource) is referred to as a "compromised computing resource." Similarly, a human resources that can or may be recruited or induced, whether knowingly, unknowingly, or otherwise, to perform a task is referred to herein as a "compromised human resource." For further simplicity, many embodiments that follow reference only compromised computing resources but it may be appreciated that this is merely one example and that in other embodiments described herein can equivalently apply to leverage compromised human resources as well. As such, it may be understood that use of the phrase "compromised resource" can equivalently apply to either or both compromised human resources or compromised computing resources.

For example, some embodiments described herein reference systems and methods configured to automatically search, mine, and/or otherwise examine a compromised computing resource for information. Example information can include, but may not be limited to: personal identification information (e.g., names, social security numbers, telephone numbers, email addresses, physical addresses, driver's license information, passport numbers, and so on); identity documents (e.g., drivers licenses, passports, government identification cards or credentials, and so on); protected health information (e.g., medical records, dental records, and so on); financial, banking, credit, or debt information; third-party service account information (e.g., usernames, passwords, social medial handles, and so on); encrypted or unencrypted files; database files; network connection logs; shell history; filesystem files; libraries, frameworks, and binaries; registry entries; settings files; executing processes; hardware vendors, versions, and/or information associated with the compromised computing resource; installed applications or services; password hashes; idle time, uptime, and/or last login time; document files; product renderings; presentation files; image files; customer information; configuration files; passwords; and so on. It may be appreciated that the foregoing examples are not exhaustive.

Similarly, some embodiments described herein reference systems and methods configured to automatically search, mine, and/or otherwise examine a compromised human resource for information. Examples include, but are not limited to: social media information; name information; email address information; recent email correspondence; recent message correspondence; recently accessed files; recently placed telephone calls; and so on. It may be appreciated that the foregoing examples are not exhaustive.

For simplicity of description, the foregoing example operations and processes are referred to herein as "mining" of a compromised resource.

In some examples, mining a compromised computing resource may reveal an additional service provided by the compromised computing resource that may be vulnerable to exploitation. In other examples, mining a compromised computing resource may reveal one or more additional or previously unknown computing resources that are communicably coupled to the compromised computing resource (e.g., computing resources not discoverable from a public perspective). Similarly, mining a compromised human resource may reveal one or more capabilities of that resource.

Accordingly, additional embodiments described herein reference systems and methods configured to recursively perform additional and/or supplemental entity reconnaissance, resource discovery, service discovery, appeal scoring, exploitation, and mining of compromised computing and human resources from the perspective of one or more compromised computing resources; as may be appreciated, and as noted above, a compromised computing resource may be communicably coupled to one or more additional computing resources or services that are not themselves discoverable from a public perspective. For simplicity of description, this process or operation is referred to herein as "perspective pivoting."

Collectively, and for simplicity of description, the recursive execution of the operations of entity reconnaissance, resource discovery, service discovery, appeal scoring, exploitation, mining, and perspective pivoting, whether performed in a breadth-first manner, a depth-first manner, or in any other suitable manner or order, is referred to herein as a "blackbox analysis" of a target entity.

In many embodiments, the tasks associated with a blackbox analysis of a target entity is automatically performed by a system, such as described herein, that is configured to operate in an unobtrusive and unnoticeable manner in order to avoid detection, blacklisting, rate liming, interference, and/or blocking by (herein, for simplicity, "detection by") a target entity or a third party, such as an internet service provider or virtual or physical host service.

As such, in many embodiments, a system, such as described herein, is additionally configured to segment tasks to be performed in the course of a blackbox analysis into discrete activities (referred to herein as "reconnaissance plans" or, more simply, "plans") that are defined by one or more sets of discrete assignments (referred to herein as "jobs") to execute specific items of computational "work" (e.g., computational tasks).

In this manner, by splitting each task associated with a blackbox analysis into discrete items of computational work to be performed, such work can be assigned to, and executed by, any suitable computing device in communication with, or under the control of, the system.

Accordingly, in many embodiments, a system, such as describe herein, can be configured to maintain a rotating pool of temporary or ephemeral virtual machines, hosted by one or more virtual computing environments. In some examples, different sets or portions of the pool of worker nodes can be instantiated in different physical locations or jurisdictions. The term "virtual computing environment," as used herein, refers to any system, technique, or architecture implemented to distribute access to shared physical hardware resources (e.g., processors, memory, network connections, and so on) among one or more instances of one or more "virtual machines" or "containers" that may be freely instantiated and decommissioned.

As such, it may be appreciated that a virtual computing environment may refer to any suitable known or later-developed technique, design, or architecture for hardware virtualization, network virtualization, storage virtualization, memory virtualization, containerization, and/or any combination thereof whether such virtualization or containerization is configured to aggregate multiple physical hardware resources into a single virtual machine or container and/or is configured to distribute access to physical hardware resources among multiple virtual machines or containers. In many cases, such an architecture is referred to as a "distributed work" architecture.

In these embodiments, each temporary or ephemeral virtual machine in a pool, group, or other set of virtual machines can be configured to receive and execute items of computational work assigned by the system. In these and related embodiments, the "worker nodes" (also referred to as "ephemeral nodes") are specifically configured to complete one or more items of computational work. As noted above, that work can be related to any task or operation of a system, such as described herein, including but not limited to: entity reconnaissance, computing and human resource discovery, service and capability discovery, appeal scoring, exploitation and recruitment, mining, and perspective pivoting.

Once the computational work assigned to a particular worker node is complete, that worker node can be decommissioned, discarded, or otherwise terminated, although this is not required and a worker node can complete other work related to the same entity or a different target entity. In this manner, the system can perform computational work associated with a blackbox analysis of a target entity while avoiding detection by a target entity, as discrete items of computational work are performed by separate, distinct, and/or ephemeral machines not readily associable with the system itself. For example, even if a single worker node is detected and/or blocked by a target entity or third party, the computational work of a blackbox analysis, such as described herein, can continue by automatically assigning the work previously assigned to the detected worker node to a new worker node.

For example, a system may determine that entity reconnaissance of a target entity should include, among other tasks, periodic interrogation of a particular IP address to determine whether that IP address is static, or is subject to change. In this example, the system can establish a plan to interrogate the IP address once every two days. A first job to perform the work of interrogating the IP address on a first day can be assigned to a first worker node, whereas a second job to perform the work of interrogating the IP address on a second day can be assigned to a second worker node. The first and second worker nodes can announce to the system when each respective work has been completed or has failed. Thereafter, the system can fetch the results of each work from each of the first and second worker nodes. In this manner, and as a result of this construction, work is effectively performed on behalf of the system for the benefit of entity reconnaissance without the system exposing itself to potential detection by the target entity or by a third party.

In another example, a system may determine that capability discovery of a human resource should include, among other tasks, sending of one or more emails or social media messages that may induce the human resource to perform a task on behalf of the system (e.g., click a link that causes code execution or causes a computing resource to access a system or server under the control of the system and so on). In this example, the system can establish a plan to send an email to the human resource, at one or more addresses, at an interval. A first job can be assigned to a first worker node to perform the work of sending an email with captivating content relevant to the human resource that may induce the human resource to click a hyperlink (e.g., referencing the human resource by name, referencing a social media account of the human resource, referencing a social or professional network colleague of the human resource and so on), a second job can be assigned to a second worker node to perform the work of hosting a web page to which the hyperlink is anchored, and a third worker node can be assigned to a third worker node to perform the work of reserving a domain name for the second worker node. In these examples, a person of skill in the art may recognize that no requirement exists for work to be performed by different worker nodes at the same time; in many embodiments, work is performed by different nodes at different times or in stages or in a particular order. For example, the third worker node may be required to complete the third job prior to the second worker node completing the second job prior to the first worker node completing the first job, and so on.

In another example, a system may determine that service discovery of a computing resource should include, among other tasks, port scanning. In this example, the system can establish a plan to scan a set of ports (such as ports associated with a particular service or protocol) at an interval. A first job to perform the work of scanning a first subset of the ports to be scanned can be assigned to a first worker node, a second job to perform the work of scanning a second subset of the ports to be scanned can be assigned to a second worker node, and a third job to perform the work of scanning a third subset of the ports to be scanned can be assigned to a third worker node.

In this example, the first, second, and third subsets of ports to be scanned by the system may overlap such that certain ports are scanned more than once, by different worker nodes. In this example, like other examples described herein, the worker nodes can announce to the system when each respective work has been completed or has failed. Thereafter, the system can fetch the results of each work from each of the worker nodes. In this manner, and as a result of this construction, work is effectively performed on behalf of the system for the benefit of service discovery without the system exposing itself to potential detection by the target entity or by the computing resource.

Additional embodiments described herein reference systems and methods to schedule the assignment and execution of computational work, associated with a particular blackbox analysis of a particular target entity, to one or more worker nodes. In these examples, the execution and creation of plans and/or jobs can be managed by assigning associated computational work to each node in a pool of worker nodes (which may be geographically or jurisdictionally separated) in a sequential or round robin manner. However, this is merely one example, and work can be assigned to worker nodes in a pool of worker nodes, wherever such nodes are instantiated, in any suitable manner.

In still further examples, a system or method such as described herein can be configured to generate new plans and/or jobs to be completed in the course of a blackbox analysis of a particular target entity, after computational work from a previously assigned plan or job completes. For example, in one embodiment, work associated with an entity reconnaissance operation can include subdomain enumeration. Once one or more subdomains of a domain name of the target entity have been discovered via computational work associated with an entity reconnaissance operation, a system such as described herein can be configured to automatically generate a plan and/or one or more jobs to perform a resource discovery operation based on the subdomain information or data. For example, a resource discovery plan may include a job to perform the computational work of resolving a particular subdomain to an IP address and, thereafter, a job to perform the computational work of determining a hardware manufacturer or software vendor of a physical or virtual machine associated with the discovered IP address, and so on. In this manner, a system, such as described herein, can automatically and recursively create plans, jobs, and assignments of computational work to perform a blackbox analysis of a particular target entity without the system exposing itself to potential detection by the target entity or by a third party.

Additional embodiments described herein reference systems and methods for securely processing and sharing data while performing a blackbox analysis of a particular target entity. More specifically, in many implementations, a system, such as described herein, includes a number of purpose-configured physical and/or virtual machines (referred to herein as a "service managers"), each tasked with a particular function or set of functions. In many cases, such an architecture is often referred to as a "modularized" or "microservices" system architecture, contrasted with a monolithic system architecture. It may be appreciated that a modularized system architecture can be scalable (due, in part, to defined application programming interfaces between discrete system managers or modules) and secure and stable (due, in part, to isolation of features and functions). In many cases, systems described herein are configured for event-based communications (e.g., event queues receive events or announcements of state and individual microservices or modules consume relevant events and perform actions in response thereto).

For example, a first service manager may be configured to fetch results from worker nodes that have announced completion of work. A second service manager may be configured to receive information or data obtained by the first service manager and process, format, validate, or otherwise manipulate that received information or data. A third service manager may be configured to receive formatted information or data from the second service manager to perform an appeal scoring operation based on an appeal heuristic.

In these examples, communication between each service manager can be encrypted and secure. In this manner, and as a result of this construction, different operations and/or service managers of a system, such as described herein, can be performed with different permissions in order to increase the security of information received, manipulated, analyzed, and/or stored by the system.

Additional embodiments described herein reference systems and methods for securely storing data while performing a blackbox analysis of a particular target entity. More specifically, in many implementations, a system, such as described herein, includes a number of purpose-configured physical and/or virtual machines configured to securely store data collected and/or aggregated in the course of a blackbox analysis. In some cases, such data can include data or information exfiltrated from a compromised computing resource of a target entity, such as documents, text data, image data, data obtained as a result of a perspective pivot, and so on. In these examples, data and/or information owned by and/or created by the target entity can be stored in an encrypted database such that the data is only accessible to and viewable by a representative of the target entity. In this manner, a system, such as described herein, can securely receive, analyze, and store data while performing a blackbox analysis of a particular target entity without exposing data associated with that target entity to any third party, service, or threat actor.

In view of the foregoing, it may be understood that generally and broadly, as described herein, an autonomous modularized system configured to distribute work to ephemeral nodes in order perform a blackbox analysis of a target entity (optionally identified by a representative of that entity), including evaluation of discovered resources and services based on appeal or threat actor temptation heuristic, can quickly, securely, and efficiently identify and triage vulnerable computing and human resources and services under the control of that target entity that may be particularly appealing to a motivated, supported, and sophisticated third-party, nation state, or threat actor.

As a result of these described systems and methods, an entity, or an authorized representative or agent of an entity, can quickly and efficiently identify, prioritize, and neutralize vulnerabilities of interest to third parties or threat actors. In addition, the entity can quickly and efficiently identify gaps in knowledge, training, or expertise that may have caused or assisted one or more vulnerabilities to exist.

These foregoing and other embodiments are discussed below with reference to FIGS. 1, 11. However, those skilled in the art will readily appreciate that the detailed description given herein with respect to these figures is for explanation only and should not be construed as limiting.

In particular, FIG. 1 depicts a simplified schematic representation of a modularized system 100, such as described herein, that is configured to perform a blackbox analysis of one or more target entities identified by a representative of that particular target entity.

For simplicity of description and illustration, the embodiments that follow refer to a corporation as an example of a target entity and an officer of that corporation (e.g., a chief information security officer) as a representative or agent of that corporation, although it may be appreciated that these are merely isolated examples. In other cases, other entities can be targeted including, but not limited to: government agencies or offices; partnerships or firms; universities and other educational institutions; medical institutions; research institutions; individuals; utilities; and so on.

In the illustrated embodiment, the modularized system 100 implements a client-server architecture to facilitate communication with a representative of an entity. More specifically, the modularized system 100 can include, or can be communicably coupled to, a physical or virtual server, or more than one physical or virtual servers, configured to host an Internet-accessible service.

As a result of the client-server architecture, a representative of an entity can operate an arbitrary Internet-connected device (e.g., laptop, tablet, desktop computer, cellular phone, and so on) to connected to the Internet-accessible service to provide input to, and to receive information from, the modularized system 100. An example device that can be operated by a representative of an entity, such as described herein, is shown in FIG. 1 and is identified as the client device 102.

As noted with respect to other embodiments described herein, the modularized system 100 may be configured to autonomously perform a blackbox analysis of a target entity if and only if a duly-appointed and/or otherwise authorized representative of that entity has provided clear and express instructions and authorization to do so. In the illustrated example, the client device 102 can be operated by a representative of an entity to communicate an authorization to perform a blackbox analysis of the entity that the representative represents.

The client device 102 can be configured to communicably couple to the Internet-accessible service hosted by the modularized system 100 in any suitable manner. For example, in some embodiments, the client device 102 can execute an instance of an application (a "client application") configured to securely or otherwise communicably couple to the Internet-accessible service hosted by the modularized system 100. A processor or processor allocation of the client device 102 can be configured to access a memory of the client device and/or a memory remote the client device 102 (e.g., such as a memory of the modularized system 100) to obtain instructions or computer-executable code leveraged by the processor/processor allocation to instantiate the client application. In many cases, the client application may render a graphical user interface that can be used by a user of the client device to interact with the client application and/or the modularized system 100. In particular, the graphical user interface can be configured to render any number of suitable input or output fields in order to provide information/output to the user and/or to receive or solicit input from the user. In some cases, the information provided by the graphical user interface to the user may be filtered based on the technical sophistication of the user—a network security professional may be provided with a different user interface presenting different information and/or the same information in a different manner or format than a business executive.

In other cases, the Internet-accessible service hosted by the modularized system 100 may be or may include a web page that can be accessed from an Internet browser application executed by the client device 102. It may be appreciated that these foregoing examples are not exhaustive and that in other cases, the client device 102 can communicably couple to the Internet-accessible service hosted by the modularized system 100 in any other suitable manner.

Similarly, the authorization to perform a blackbox analysis of a target entity can be communicated from the client device 102 to the modularized system 100 in any suitable form or format including, but not limited to: a completed web form; a photograph of the representative; biometric information of the represented; an identity document of the representative; a name of the representative; a credential or login of the representative; and so on. Typically the authorization, along with any information communicated with the authorization, such as an identification of the target entity, is encrypted, encoded, or otherwise secured. In other cases, however, this may not be required and it may be appreciated that encryption may not be specifically required of all embodiments.

Once the authorization and identification of a target entity has been received by the modularized system 100, a blackbox analysis can begin. As noted above, a blackbox analysis of a target entity typically consists of numerous discrete tasks that can be performed, in whole or in part, by one or more service managers or data stores. Example service managers are represented in FIG. 1 and identified the service managers 104. Similarly, example data stores are represented in FIG. 1 and identified the data stores 106

The service managers 104 and the data stores 106 of the modularized system 100 can cooperate to perform or coordinate one or more operations or tasks associated with a blackbox analysis of the identified or selected target entity. Such tasks, as noted above, can include, without limitation or express requirement, entity reconnaissance, resource discovery, service discovery, appeal scoring, exploitation, mining, and perspective pivoting.

These operations can be performed in sequence or, in some cases, simultaneously or contemporaneously. In addition, and as noted above, completion of one task or operation, or, more specifically, completion of a plan or a job associated with a particular task or operation, can trigger another task or operation. In this manner, and as noted with respect to other embodiments described herein, the modularized system 100 can perform the various operations associated with a blackbox analysis recursively.

The service mangers 104 and the data stores 106 of the modularized system 100 can be implemented in any suitable manner. In many embodiments, each of the service managers 104 and the data stores 106 are embodied as one or more instances of purpose-configured software or other executable code (whether precompiled, interpreted at runtime, or otherwise and/or a combination thereof) stored in a nonvolatile memory entirely or partially local or remote to the modularized system 100. The executable code includes instantiation instructions that, when executed by a processor (or a processor allocation of a virtualized or containerized implementation) cause the processor to construct/instantiate one or more data structures, classes or methods, frameworks, libraries, and so on. In addition, one or more memory structures or databases (and/or one or more interfaces, servers, or APIs facilitating access to the same) can be instantiated by the processor/processor allocation.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein, such as the modularized system 100, can be implemented in a number of suitable ways. For simplicity of description, many embodiments that follow are described in reference an implementation in which discrete functions of the system are implemented as discrete microservices. It is appreciated that this is merely one possible implementation.

Further to examples introduced above, it may be appreciated that a system such as described herein, including the modularized system 100, can leverage one or more physical servers, network appliances, and/or storage appliances (each of which may include, without limitation: a processor; memory; storage; network connections; and so on) or, additionally or alternatively, include a virtual server or container, that is virtualized or containerized, in whole or in part, in a virtual computing environment. In some cases, the modularized system 100 can be implemented, in whole or in part, as a cloud service operating on an arbitrary number of physical servers that may, or may not, be geographically distributed. In still further examples, the modularized system 100 can be operated, in whole or in part, in a serverless virtual computing environment in which discrete functions of the system are performed by scalable anonymous functions or methods/literals, which may be referred to as lambda functions or lambda abstractions.

Figure 2:
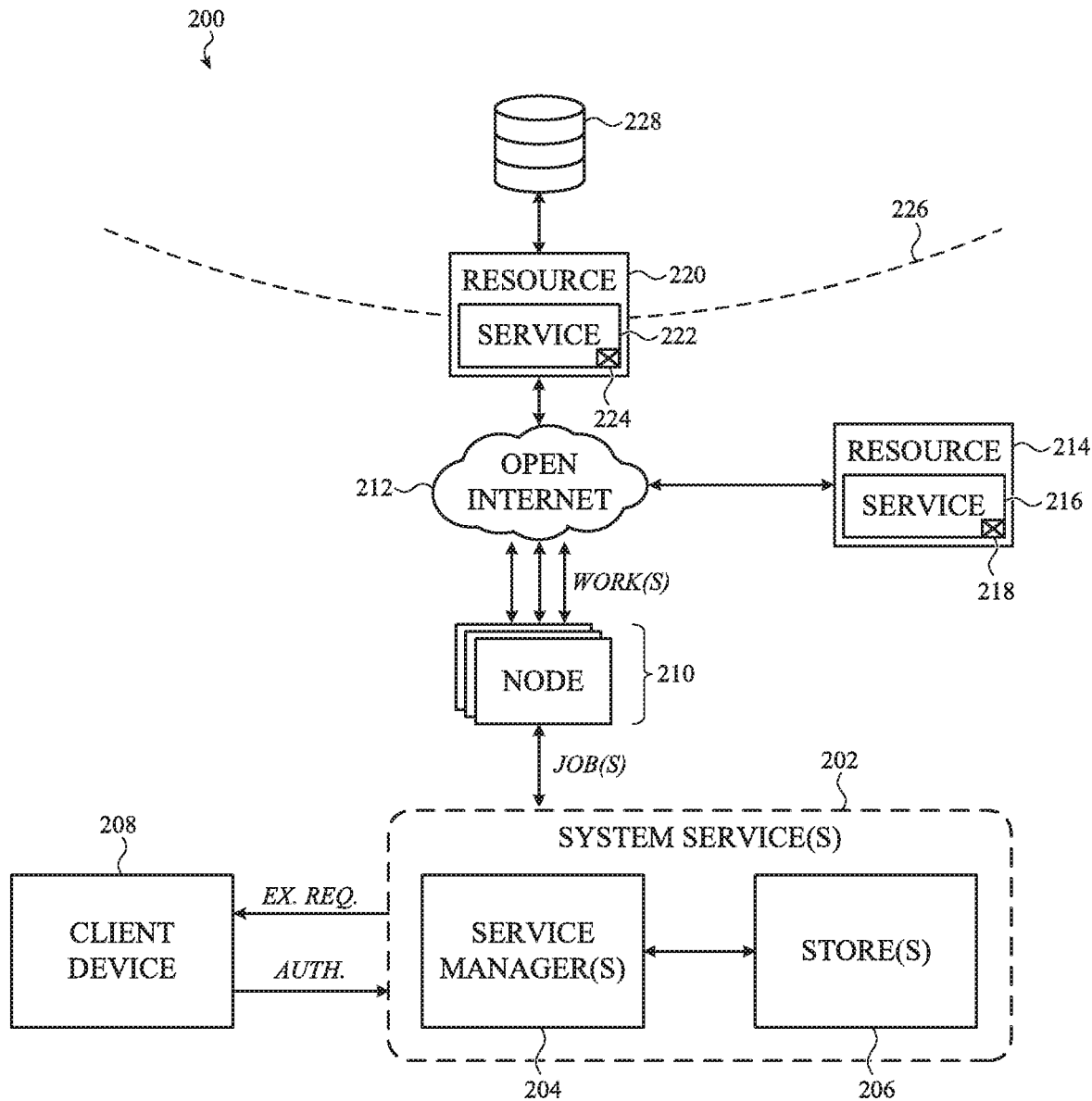
FIG. 2 depicts another schematic representation of a system, such as described herein.

FIG. 2 depicts another schematic representation 200 of a modularized system 202, such as described herein. In particular, as with the embodiment depicted in FIG. 1, the modularized system 202 includes one or more service managers 204 and one or more data stores 206 that are configured to communicate with one another and with a client device 208 that can be operated by a representative of a target entity, such as described herein.

After receiving an authorization from the client device 208, the modularized system 202 and, more specifically, one or more of the service managers 204 and the data stores 206 can cooperate to autonomously perform a blackbox analysis of an identified target entity.

In one example, a first service manager of the service managers 204 may begin the blackbox analysis of the target entity by triggering or scheduling an entity reconnaissance operation based on information received from the client device 208 by the modularized system 202. For example, as noted above, the representative of the target entity may provide an email address.

In this example, the first service manager may be configured to perform or schedule a job to perform computational work to abstract a hostname from the email address supplied by the client device 208. In this manner, the first service manager obtains a hostname known to be directly associated with the target entity. In some embodiments, the first service manager can assign a "confidence score" or other statistical value to the hostname extracted from the email address supplied by the client device 208. The confidence score corresponds to a judgement of whether the hostname is actually under the control or administration of the identified target entity. The confidence score can fall within a range from a minimum to a maximum (e.g., 0 to 100 or 0 to 255), although this is not required. In this example, because the hostname was extracted directly from user-supplied content (e.g., entity-supplied content), the first service manager can assign a high confidence score, such as 100 or 255. It may be appreciated, however, that a definition of a "high" confidence score may vary from embodiment to embodiment or implementation to implementation. In some cases, a confidence score of 50 out of 100 may be considered "high" whereas in other cases, a confidence score of 10 out of 100 may be considered "high." As such, generally and broadly, it may be appreciated that a "high" confidence score as contemplated herein is a score, vector, matrix, or other data structure or mathematical construct having a value or magnitude that, for a given implementation or construction, is statistically more significant (e.g., satisfying a fixed or adjustable threshold) than other values in a given set of values.

Continuing the preceding example, after being assigned a suitably high confidence score by the first service manager, the hostname can be stored in one or more databases of the data stores 206 and can be tagged and/or categorized as a high-confidence data item. In other words, the modularized system 202 can treat the hostname as high-value data because the origin of that data is verified or otherwise known to be associated with the target entity.

In response to obtaining and/or storing a hostname associated with the target entity, the first service manager, or, in other embodiments, another service manager of the service managers 204, can be configured to develop or retrieve a plan to investigate and/or analyze that hostname (e.g., entity reconnaissance).

For example, in some embodiments, a pre-configured plan file, template, schema, or configuration can be stored in one or more databases of the data stores 206, or in a remote database accessible to the modularized system 202. In other embodiments, a plan for investigating a hostname may be assembled or created on demand by one or more of the service managers 204. For simplicity of description, the embodiments that follow reference an implementation in which one or more plan templates are stored in a database of the data stores 206.

Continuing the preceding example, the first service manager, or, in other embodiments, a second service manager of the service managers 204, can be configured to schedule one or more jobs associated with a selected plan or plan template for performing an entity reconnaissance operation and, in particular, for obtaining information related to the known hostname.

For example, a selected plan for obtaining information related to a hostname can include, but may not be limited to: a job to determine an IP address of a hostname by accessing a third party database; a job to determine an IP address of a hostname by accessing a domain name service; a job to determine one or more header or header types received in response to a request submitted to the hostname; a job to retrieve one or more resources (e.g., style sheets, scripts, images, text, files, and so on) hosted by a server responding to queries submitted to the hostname; a job to enumerate subdomains of the domain name; a job to obtain a Robot Exclusion Standard file; a job to submit a query to a third-party database regarding the hostname or one or more owners or administrators of a the hostname; and so on.

As noted with respect to other embodiments described herein, once one or more plans and/or jobs are scheduled to be executed, the computational work associated with such plans and jobs can be assigned to one or more worker nodes in a pool of worker nodes, which are typically ephemeral and may be instantiate in any number of suitable jurisdictions or physical locations by selecting specific cloud providers and/or by selecting instantiation or orchestration options provided by certain cloud/container/virtual machine providers. An example pool of worker nodes is provided in FIG. 2 and is identified as the pool of worker nodes 210.

As computational work is performed and completed across the open Internet 212 by the various worker nodes of the pool of worker nodes 210, the modularized system 202 continually receives (and/or fetches from one or more worker nodes) information and/or data that may, or may not, be related to the target entity. Thus, as the modularized system 202 ingests data that results from the completion of work, each data item is tagged and/or categorized based on a confidence that the data item actually relates to the target entity. For example, a first job to determine an IP address of a hostname by accessing a third party database may return a different IP address than a second job to determine an IP address of a hostname by accessing a domain name service. Accordingly, in this example, a result of the computational work of the first job (e.g., the IP address returned from the third party database) may be categorized as a low-confidence data item whereas the result of the computational work of the second job (e.g., the IP address returned from the domain name service) may be categorized as a high-confidence data item.

Additionally, as the modularized system 202 ingests data that results from the completion of work, each data item can be analyzed to determine whether that data item is related to, or otherwise associated with, another data item already ingested by the modularized system 202. For simplicity, such an operation is referred to herein as building and/or updating a mathematical "graph" of data items, wherein each "point" of the graph corresponds to a particular data item and each "edge" of a graph corresponds to a relationship between connected points. In many examples, a graph, such as described herein, can be a simple graph, a pseudograph, or a multigraph having directed or undirected edges, or oriented or unoriented edges; it may be appreciated that any suitable graph may be constructed.

In another, non-liming phrasing, as the modularized system 202 ingests data, one or more existing edges or points (of one or more connected or discrete graphs) can be updated. For example, in response to determining with high confidence that a particular IP address is associated with a hostname, an edge of a graph connecting the IP address data item to the hostname data item can be categorized a high-confidence connection. Similarly, if the modularized system 202 is highly confident that the hostname data item is actually associated with the target entity, a confidence value of the IP address data item can be increased as well. In this manner, new data items ingested by the modularized system 202 can change previously-determined confidences in other data items and graph edges already ingested or stored by the modularized system 202. It may be appreciated that confidence values can be adjusted or modified by the modularized system 202 in any suitable manner; confidences may be increased, decreased, ignored, nullified, and so on.

As noted with respect to other embodiments described herein, as the modularized system 202 ingests data associated with a particular operation or task (e.g., entity reconnaissance, resource discovery, service discovery, and so on), additional plans, jobs, or items of work can be automatically scheduled. For example, a resource discovery operation can follow an entity reconnaissance operation. In another example, a service discovery operation can follow a resource discovery operation, and so on.

For example, as shown in FIG. 2, the modularized system 202 may discover the computing resource 214 as a result of a resource discovery operation that was scheduled after completion of at least some computational work associated with an entity reconnaissance operation that, as one example, had discovered a subdomain owned by the target entity.

Continuing the preceding example, after completion of at least some computational work associated with the resource discovery operation, a service discovery operation can be performed against the computing resource 214. As a result of completion of at least some computational work associated with the service discovery operation, a service 216 may be discovered. In addition, as a result of completion of at least some computational work associated with the service discovery operation, the service 216 may be discovered to have a vulnerability 218.

Continuing the preceding example, the modularized system 202 may also discover the computing resource 220 as a result of the resource discovery operation that was scheduled after completion of at least some computational work associated with the entity reconnaissance operation referenced above. In this example, after completion of at least some computational work associated with the resource discovery operation, a service discovery operation can be performed against the computing resource 220 that discovers a service 222 with a vulnerability 224. In addition, as a result of the resource discovery operation, the modularized system 202 may determine that the computing resource 220 is likely to be communicably coupled to a private network 226 controlled by or administered by or under the authority of the target entity (e.g., based on a determined physical location of the computing resource 220, based on a database 228 to which the computing resource 220 has access, and so on).

As with other embodiments described herein, the modularized system 202 may also be configured to perform an appeal scoring operation in which an appeal or temptation score is set or updated for a particular computing resource or service. Similar to confidence scoring, an appeal scoring operation can occur with, or after, other operations described herein.

In one example, the modularized system 202 may determine that the computing resource 220 has a higher appeal, or a greater temptation value, than the computing resource 214 to an third party based on a determination that the computing resource 220 is likely to be communicably coupled to the private network 226.

In another example, the modularized system 202 may determine that the computing resource 220 has a higher appeal than the computing resource 214 based on a determination that the computing resource 220 is likely to be communicably coupled to the database 228.

In another example, the modularized system 202 may determine that the computing resource 220 has a higher appeal than the computing resource 214 based on a determination that the vulnerability 224 is more reliably exploited than the vulnerability 218.

In still other embodiments, other means of increasing, decreasing, adjusting, or setting a temptation value or appeal score (or vulnerability attractiveness or a predicted propensity to draw the reconnaissance effort of an antagonistic third party), whether or not an exploit is known to exist for a particular service or set of services, can be used, including, but not limited to: accessing a database or lookup table based on a service type, service version, service host, and so on; accessing a database or lookup table based on a computing resource type, computing resource version, and so on; accessing a database or lookup table based on an indicator of unsophisticated implementation; and so on. Appeal scores, attractiveness scores and the like described herein can be represented as numerical values, a graduated scale, via labels or using any suitable method. Generally and broadly, it may be understood that an appeal score (and similar terms used herein) corresponds to a numerical or otherwise quantified prediction, such as a likelihood value, that an antagonistic third party would attempt to execute an exploit, and/or to perform reconnaissance operations against, of the associated computing resource.

Once a computing resource or service of a computing resource is determined to be of high appeal to an third party and, additionally, is determined to have a vulnerability, the modularized system 202 can (optionally) signal the client device 208 to request authorization to exploit the vulnerability. In response, the modularized system 202 can retrieved an appropriate exploit payload (e.g., precompiled binary, plain text script, SQL injection strings, and so on) stored in a database of the data stores 206 in order to exploit the vulnerability.

Thereafter, the modularized system 202 can package the retrieved exploit payload with a job and assignee that job to a worker node in the pool of worker nodes 210. Upon successful exploitation of the vulnerability (e.g., the vulnerability 224), the modularized system 202 can (optionally) signal the client device 208 to report that a computing resource under the control or administration of the target entity has been successfully compromised and, optionally, that additional computing resources (such as the database 228 shown in FIG. 2) which are or may be communicably coupled to the compromised computing resource may also be vulnerable to an exploit.

These foregoing embodiments depicted in FIGS. 1, 2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, it may be appreciated that, generally and broadly, embodiments of a system described herein can be configured to autonomously conduct or perform blackbox analysis of a target entity by recursively assigning and/or scheduling specific computational work (that may be associated with entity reconnaissance, resource discovery, service discovery, appeal scoring, resource or service exploitation, mining of compromised computing resources, and perspective pivoting) to a pool of ephemeral nodes, implemented as virtual machines accommodated by one or more virtual computing environments (hosted or provided by one or more cloud services vendors). In addition, a system such as described herein can leverage modular network topologies to increase scalability, increase information security, and increase reliability.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
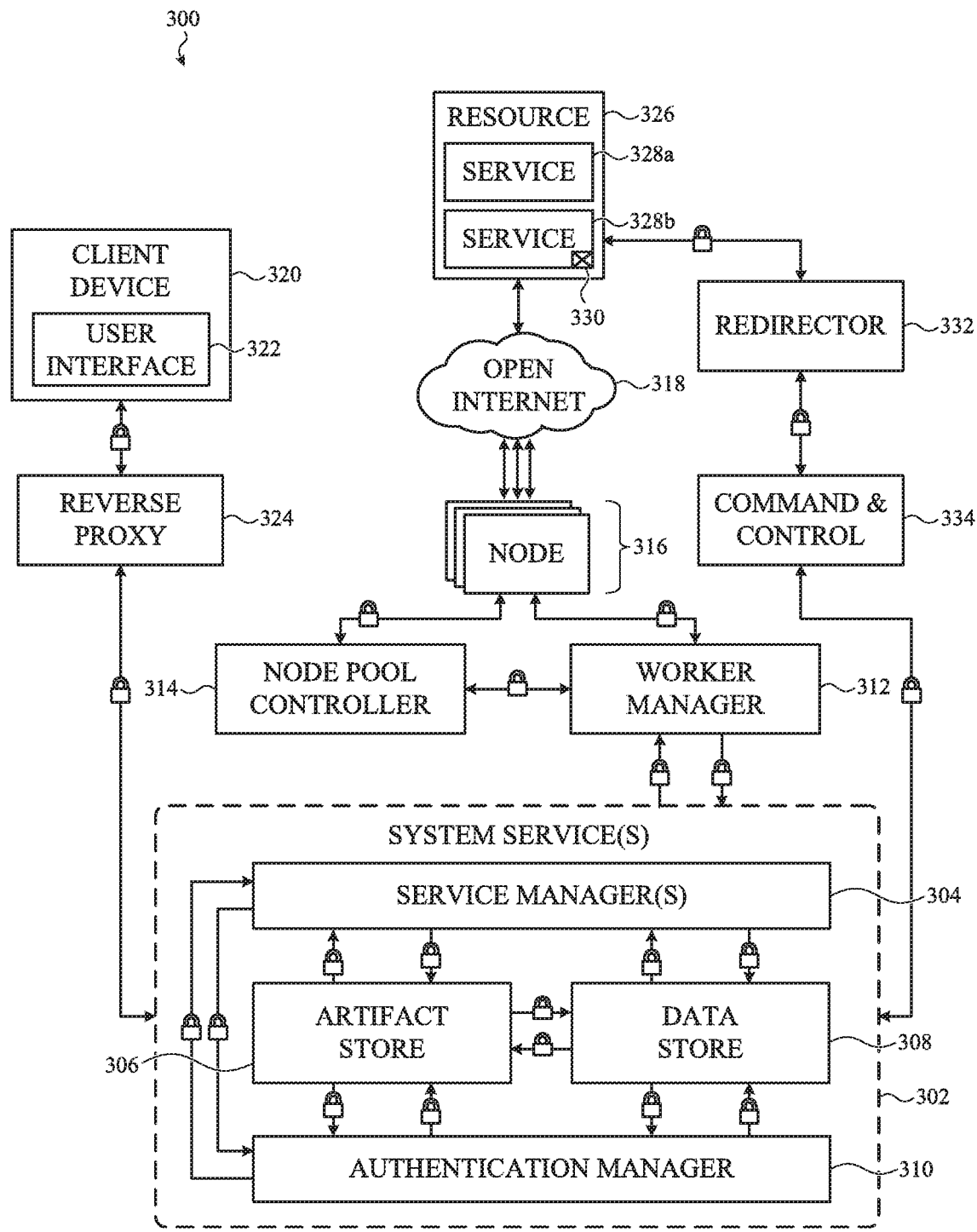
FIG. 3 depicts another schematic representation of a system, such as described herein.

For example, FIG. 3 depicts another schematic representation 300 of a modularized system 302, such as described herein. The modularized system 302 can be configured in a similar manner as described above in reference to the embodiment shown in FIG. 2; this description is not repeated.

In the illustrated embodiment, the modularized system 302 includes a number of system managers (identified, collectively, as the system managers 304), a number of data stores (two of which are identified as the artifact store 306 and the data store 308), and an authentication manager 310.

As with other embodiments described herein, the system managers 304 of the modularized system 302 can be configured in any suitable manner to determine plans, jobs, and/or work to be performed. The system managers 304 can be configured in a similar manner as described above in reference to the embodiment shown in FIG. 2; this description is not repeated.

As with other embodiments described herein, the data stores of the modularized system 302 can be configured to securely store (e.g., in an encrypted databased) any suitable data. In the illustrated embodiment, the modularized system 302 includes an artifact store 306 that is specifically configured to securely store files in any arbitrary format of any size. In typical implementations, the artifact store 306 can be used to store, in an encrypted manner, data or other files exfiltrated from a compromised resource.

Additionally, in the illustrated embodiment, the modularized system 302 includes an data store 308 that is specifically configured to securely store data items obtained or otherwise retrieved in the course of a blackbox analysis of a target entity.

The modularized system 302 also includes an authentication manager 310. The authentication manager 310 can be purpose-configured to store, retrieve, and verify cryptographic tokens, credentials, keys, certificates, and the like, in order to facilitate secure communication by and between modules or components of the modularized system 302. In the illustrated embodiment, a lock-shaped icon is used, generally and broadly, to indicate a secure communication channel. In many cases, these secure communication channels, and/or credentials associated with such channels, can be established, at least in part, by the authentication manager 310.

In the illustrated embodiment, the modularized system 302 is also coupled to a workload manager 312 and a node pool controller 314. The workload manager 312 can be configured to supervise the execution of computational work that is performed by one or more of the worker nodes associated with a pool of worker nodes 316 each configured to perform computational work across the open internet. For example, the workload manager 312 may be configured to supervise and/or monitor, without limitation: processor utilization of one or more worker nodes; memory utilization of one or more worker nodes; network traffic of one or more worker nodes; processes or operations running on one or more worker nodes; how many worker nodes are in the pool of worker nodes 316; the age of one or more worker nodes; how many nodes are in service; how many nodes should be discarded; and so on.

Further, the workload manager 312 can be configured to assign and/or rate-limit work assigned to the various worker nodes of the pool of worker nodes 316 (e.g., to prevent accidental denial of service effects to a computing resource of a target entity) in any suitable manner. For example, the workload manager 312 may be configured to determine an order by which new work is assigned to worker nodes having available bandwidth. One example is a round-robin or first-in-first-out order, although other orderings, both random and patterned, are possible.

Further, the workload manager 312 may be configured to listen for completion or failure of jobs or computational work. In this manner, the workload manager 312 can serve as a proxy for communication between the modularized system 302 and the worker nodes in the pool of worker nodes 316.

In some cases, the workload manager 312 can buffer or queue results of one or more jobs fetched or received from one or more worker nodes prior to announcing to the modularized system 302 that a job or a plan has completed. In some implementations of these examples, information, including data items or documents, can be communicated between the workload manager 312 and the modularized system 302 in batches.

The node pool controller 314 is communicably coupled to the workload manager 312 and is configured to manage the provisioning and decommissioning (e.g., setup and cleanup) of worker nodes based on instructions or signals received from the workload manager 312. For example, if the workload manager 312 determines that a worker node should be discarded, the workload manager 312 can signal the node pool controller 314 to initiate the process of decommissioning that worker node. Similarly, if the workload manager 312 determines that one or more worker nodes are required to service a job or a plan received from the modularized system 302, the workload manager 312 can signal the node pool controller 314 to initiate the process of provisioning new worker nodes.

In some cases, the node pool controller 314 and the workload manager 312 can be implemented as a single controller or manager.

The modularized system 302, as with other embodiments described herein, can implement a client-server architecture in order to communicate with a client device 320 that includes a user interface 322 for receiving input from, and displaying output to, a representative of a target entity. In some embodiments, the client-server architecture implemented by the modularized system 302 can be positioned behind a reverse proxy 324 or other traffic-directing network appliance in order to further isolate the modularized system 302 from the client device 320 or, more generally, the open internet 318.

As noted with reference to other embodiments described here, the modularized system 302 can be configured to perform blackbox analysis of a target entity. As with the embodiment(s) described above in reference to FIG. 2, the modularized system 302 can be configured to perform entity reconnaissance, resource discovery, service discovery, appeal scoring, resource or service exploitation, mining of compromised computing resources, and/or perspective pivoting.

In the illustrate example, the modularized system 302 has discovered presence of a computing resource 326 that and two services of that computing resource, one of which is a service not known to have a vulnerability (identified as the secure service 328a) and one of which is a service that is known to have a vulnerability 330 (identified as the insecure service 328b).

As described in reference to other embodiments presented herein, the modularized system 302 in the illustrated embodiment can autonomously and automatically access an exploit store (e.g., within the data store 308) to retrieve an exploit payload to package with a job assignment to one or more worker nodes in to perform the computational work of executing the exploit (e.g., delivering the payload) of the vulnerability 330 of the insecure service 328b of the computing resource 326.

In many embodiments, the exploit payload, and/or the worker node(s) deploying the exploit payload, is configured to perform a self-diagnostic routine or operation to verify whether the exploit of the insecure service 328b was successful. If the exploit was not successful, a message or announcement can be optionally provided back to the modularized system 302 (e.g., via the workload manager 312, or via a dedicated callback route defined by a redirector 332 and/or a command and control server 333). In other cases, an exploit may fail intentionally silently. In still other cases, a second worker node can be assigned to perform computational work to verify whether an exploit of a service succeeded.

If an exploit payload is successfully delivered, a number of subsequent operations can be performed. For example, in many embodiments, an exploit payload may be configured to attempt privilege escalation. In other embodiments, an exploit payload may be configured to perform a mining operation.

In many embodiments, however, an exploit payload is configured for a limited purpose of establishing a communication channel from the compromised computing resource back to the modularized system 302 via a dedicated callback route defined by a redirector 332 and/or a command and control server 334. The redirector 332, which may be ephemeral or otherwise, is configured to obfuscate the destination of communications originating from a compromised computing resource, such as the computing resource 326 as shown in FIG. 3. In some embodiments, a redirector 332 may not be required or preferred.

Once an exploit payload establishes communication with either the command and control server 334 or the modularized system 302, a private communication binary (herein, a "communication payload" or an "agent"), such as a virtual private network client, can be transmitted and/or otherwise transferred to the compromised computing resource such that communication with the compromised computing resource can be maintained. Once the communication payload is successfully deployed to the compromised computing resource, the modularized system 302 can utilize the compromised computing resource to perform computational work related to the blackbox analysis. In addition, the modularized system 302 utilize the compromised computing resource to mine itself for data, documents, or information for exfiltration to the artifact store 306. In many cases, the compromised computing resource can be configured to encrypt data, documents, or information prior to transmitting the same via the communication channel established by the communication payload, but this may not be required of all embodiments.

Still further, as noted above, a compromised computing resource may have a different "perspective" than the public perspective of the worker nodes of the pool of worker nodes 316. In other words, the compromised computing resource may be communicably coupled to, or may have the ability to communicably couple to, one or more resources within a private network controlled or administered by the target entity. As such, the compromised computing resource can be used by modularized system 302 to perform additional entity reconnaissance, resource discovery, service discovery, appeal scoring, resource or service exploitation, mining of compromised computing resource, and/or perspective pivoting, such as described herein.

These foregoing embodiments depicted in FIG. 3 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4A:
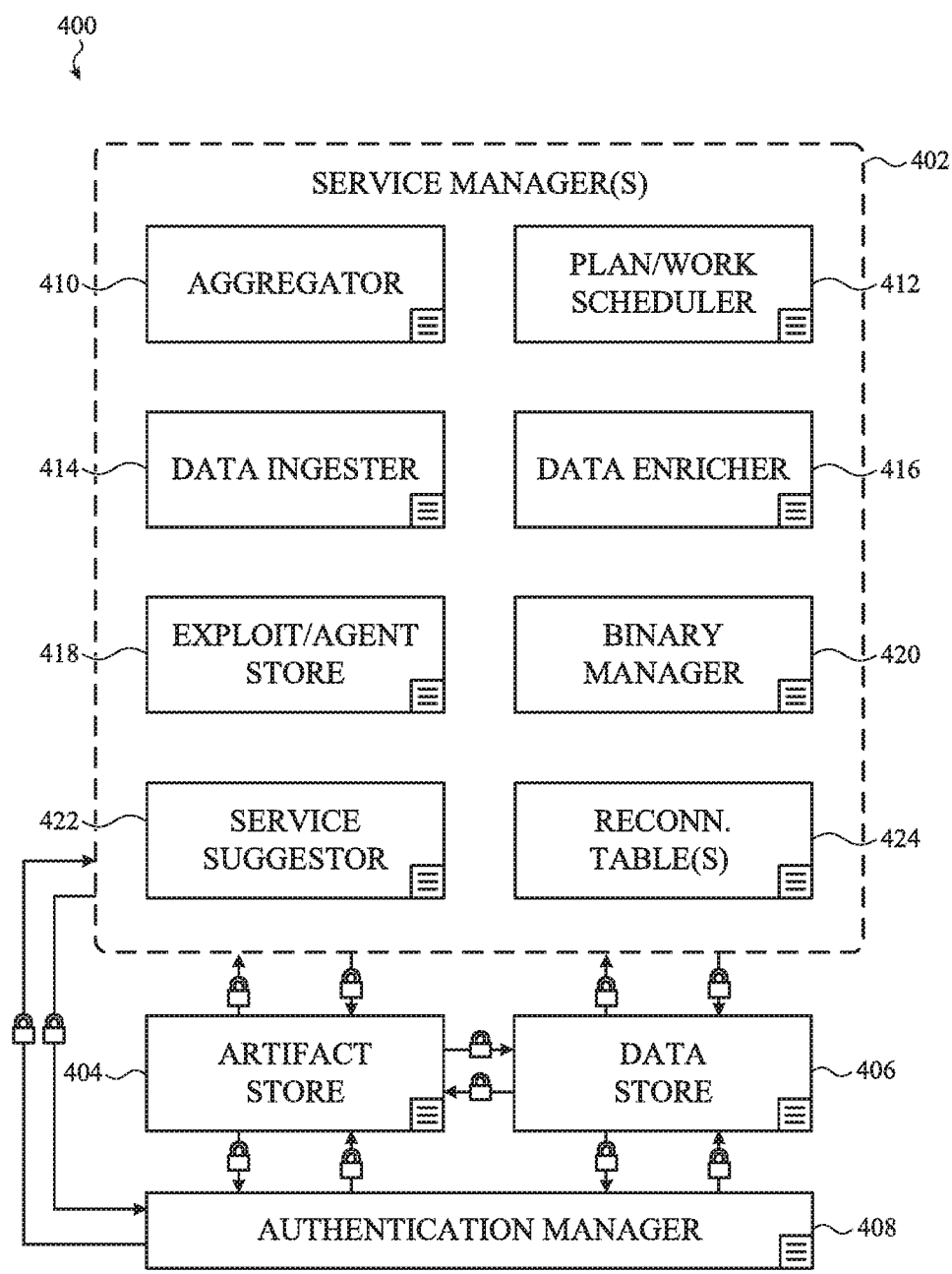
FIG. 4A depicts a schematic representation of a system, such as described herein, including a secure network of purpose-configured physical and/or virtual machines.

For example, a modularized system, such as described herein, can include a number of purpose-configured physical and/or virtual machines, referred to herein as service managers, each tasked with a particular function or set of functions. FIG. 4A depicts a schematic representation 400 of a modularized system 402, including a number of discrete service managers.

The modularized system 402, as with embodiment described in reference to FIG. 3, can be securely communicably coupled to an artifact store 404, a data store 406, and an authentication manager 408. The artifact store 404, the data store 406, and the authentication manager 408 can be configured in the same manner as described above with reference to FIG. 3; this description is not repeated.

As noted above, the modularized system 402 includes a number of discrete modules or services managers; in the illustrated example, eight discrete modules are snow. In particular, the modularized system 402 includes a data aggregator 410, a plan scheduler 412, a data ingester 414, a data enricher 416 (also referred to, more generally, as a "data processor" or "data analyzer"), an exploit/agent store 418, a binary manager 420, a service suggestor 422, and a reconnaissance table generator/store 424. It may be appreciated that although communication paths are not shown to couple each of the service managers of the modularized system 402 depicted in FIG. 4A, secure communication channels are understood to couple each service manager to each other service manager or, alternatively, to couple specific service managers to one another; any suitable signal path or communication pathways may exist or be established. It is appreciated that these paths are omitted from FIG. 4 for simplicity of illustration.

In some embodiments, the data aggregator 410 of the modularized system 402 in configured to monitor and supervise the state of all data in the modularized system 402. In this manner, the data aggregator 410 can serve as a change-tracking and/or version tracking system that facilitates capture of data or information and facilitates capture of how data or information obtained by the modularized system 402 changes over time. For example, the data aggregator 410 can be configured to monitor and record how IP addresses associated with a particular computing resource or hostname change or are assigned over time, how subdomains of a domain change over time, how ports or other communication channels of a computing resource open or close over time, and so on.

In addition, the data aggregator 410 of the modularized system 402 can be configured to regularly (e.g., at regular intervals or in response to a time-based or event-based trigger) comb through one or more databases, such as the data store 406 and/or the artifact store 404, in order to implement strict change tracking for all fields of all data items and documents stored in those databases. In this manner, the data aggregator 410 of the modularized system 402 memorializes effectively every change, movement, or modification of data the occurs in the course of operating the modularized system 402. As a result, every action performed by the modularized system 402, and/or any module or service thereof, can be audited at a later time.

For example, as a result of the data aggregator 410, the modularized system 402 can track, for each data item: the work performed to obtain the data item; identity and/or addresses of the worker node(s) that performed the work to obtain the data item; the time, manner, or format in which the data item was received by a workload manager; the time(s) or manner(s) by which the data item was formatted or modified by the modularized system 402; the time(s) at which the data item was accessed by a user of the modularized system 402; the identity of a user of the modularized system 402; and so on. It may be appreciated that the foregoing list is not exhaustive.

In some embodiments, the plan scheduler 412 of the modularized system 402 is configured to determine a plan and/or a series of jobs or computational work to be performed to accomplish an objective or task of the modularized system 402. In some examples, the plan scheduler 412 can be configured to announce to other modules or service managers of the modularized system 402 when work is assigned and/or completed. In addition, the plan scheduler 412 can determine one or more dependencies of a plan, a job, or an item of computational work. For example, in some cases, a job may require particular information, particular permissions, or may require a worker node to have a particular perspective before being able to be assigned. In these circumstances, the plan scheduler 412 of the modularized system 402 can be configured to access the artifact store 404 and/or the data store 406, and/or any other suitable local or remote database, in order to fulfill a dependency of a particular job or a particular plan. In typical embodiments, the plan scheduler 412 is configured to directly communicate with a workload manager, such as the workload manager 312 depicted and described in FIG. 3.

In some embodiments, the data ingester 414 of the modularized system 402 is configured to receive and or fetch the results of completed work. In some cases, the data ingester 414 may be communicably coupled to the plan scheduler 412 via a secure communication channel established, at least in part, by the authentication manager 408. In these examples, the plan scheduler 412 may fetch results of computational work from a workload manager (and/or a worker node directly) and, in response, may announce to the data ingester 414 that raw data is ready to be fetched by the data ingester 414 for processing. In other embodiments, the data ingester 414 may directly interface with a workload manager or a worker node in order to obtain raw data and/or other results of completed work.

The data ingester 414 can be configured to parse and/or otherwise process and/or parse data in any suitable manner. For example, in many embodiments the data ingester 414 is configured to parse and/or process data according to a job or plan type associated with the job that resulted in the data. In other cases, the data ingester 414 is configured to leverage a trained or untrained artificial intelligence algorithm or matching algorithm to detect particular data types and/or particular data items. For example, in one embodiments, the data ingester 414 includes one or more databases of Regular Expressions.

In still other embodiments, the data ingester 414 can include, or can be supported by, one or more image or text processing algorithms or modules. For example, in some embodiments, documents or images may be exfiltrated from a target entity. In these examples, the data ingester 414 can include an optical character recognition algorithm and/or an image recognition algorithm to extract text and/or image-based contextual information.

For example, in one specific embodiment, the data ingester 414 may receive a rasterized image or document exfiltrated from a compromised computing resource. The data ingester 414 can leverage an optical character recognition algorithm to determine whether readable text appears in the rasterized image or document. In addition or alternatively, the data ingester 414 can leverage an image processing algorithm, a computer vision algorithm, an object recognition algorithm, and/or a facial recognition algorithm to determine the content of the rasterized image or document. In still further embodiments, additional supplemental processing steps or preprocessing steps may be used.

In many embodiments, the data ingester 414 is directly communicably coupled (e.g., via a secure communication channel established, at least in part, by the authentication manager 408) to one or more databases, such as the artifact store 404 and/or the data store 406. As a result of this network topology, the data ingester 414 can be configured and positioned to add data items into one or more databases substantially immediately after those data items are parsed or otherwise extracted from raw information or data received by the data ingester 414.

In some embodiments, the data enricher 416 of the modularized system 402 can be configured to comb through one or more databases of existing data, such as the artifact store 404 and/or the data store 406, in order to improve the quality and/or usefulness of the data contained therein. In this manner, the data enricher 416 of the modularized system 402 acts on data already stored in a database.

For example, the data enricher 416 of the modularized system 402 can be configured to provide or calculate one or more mathematical properties of a data item or a set of data items contained in a database such as, but not limited to: average value; maximum value; minimum value; deviation from expected value; and so on. In other cases, the data enricher 416 can be configured to perform one or more appeal scoring operations and/or confidence scoring operations on data contained in a database. For example, the data enricher 416 of the modularized system 402 can be configured to periodically comb through a database to determine whether a confidence value or an appeal value should be updated based on data that has been added to the database recently.

To advance this objective, the data enricher 416 of the modularized system 402 may be tasked in certain embodiments with updating and/or creating one more graph representations of the data stored in a database, such as the data store 406 or the artifact store 404. In other words, the data enricher 416 of the modularized system 402 can be configured to analyze the connections (e.g., depth) between individual linked data items, can be configured to monitor for data item clustering, and so on.

In still further examples, the data enricher 416 of the modularized system 402 can be configured to access a third-party database to add context or supplemental data or metadata to a particular data item. For example, an IP address may be a data item. In this example, the data enricher 416 of the modularized system 402 may be configured to access a geolocation database to assign an approximate geographic location to a particular IP address.

In some embodiments, then exploit/agent store 418 of the modularized system 402 can be configured, as a database or other storage structure or apparatus, to store the code and/or binary executables required to execute exploits of vulnerable services that may be detected by the modularized system 402. For example, may include a database of available and/or known exploits, categorized and/or tagged based on a service, service type, service version, and so on. In this manner, if the data ingester 414 receives data corresponding to a discovery of a service, the data enricher 416 may access, via a secure channel established at least in part by the authentication manager 408, the database of the exploit/agent store 418 to determine whether the discovered service is exploitable.

In other cases, the exploit/agent store 418 includes a database of known exploits and a database of implemented exploits. In this example, the exploit/agent store 418 can be used to determine whether a service is vulnerable to an exploit that is known to the public, but that is not yet implemented by, or able to be performed by, the modularized system 402.

In some embodiments the exploit/agent store 418 may also be used to store communication payloads, such as describe above.

In some embodiments, the binary manager 420 of the modularized system 402 may be communicably coupled, via a secure channel established at least in part by the authentication manager 408, to the exploit/agent store 418. The binary manager 420 may be configured to compile and/or retrieve from the exploit/agent store 418, on demand, a suitable binary to deploy to a particular operating system or to a particular computing resource. In further embodiments, the binary manager 420 may be configured to selectively, or in response to a signal or instruction from another module or service manager of the modularized system 402, recompile an already-compiled binary in order to change the hash of the binary to avoid detection.

In some embodiments, the service suggestor 422 of the modularized system 402 may be configured to monitor for services for which no known exploit exists and/or no exploit is implemented or otherwise available to the modularized system 402. Once such a service is detected by the service suggestor 422, the service suggestor 422 can generate an message (e.g., directed to an administrator of the modularized system 402) that suggests development attention to the service.

In some embodiments, the reconnaissance table generator/store 424 of the modularized system 402 can be communicably coupled via a secure channel established at least in part by the authentication manager 408, to one or more databases of the modularized system 402, such as the data store 406 or the artifact store 404. The reconnaissance table generator/store 424 can be configured to display data queried from these databases in a readable and operator-consumable format. The form and function of these tables may vary from embodiment to embodiment, and it may be appreciated by a person of skill in the art that different implementations may prefer different organizations and/or displays of data.

These foregoing embodiments depicted in FIG. 4A and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 4B:
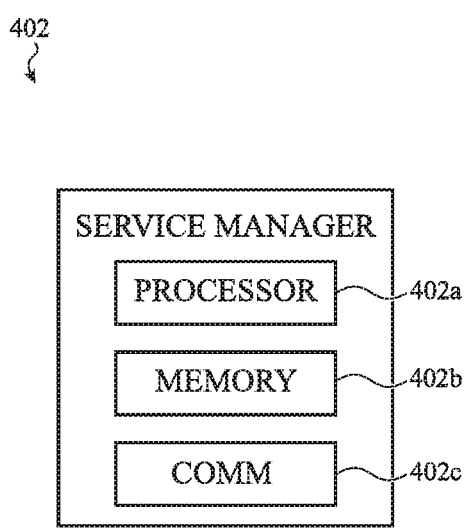
FIG. 4B depicts a simplified block diagram depicting example components of a physical and/or virtual machine, such as described herein.

For example, it may be understood that the various systems, components, modules, and managers described in reference to FIG. 4A can be physically or virtually implemented in a number of suitable ways. For example, FIG. 4B depicts a simplified block diagram depicting example components of a physical and/or virtual machine, that can be configured to operate as any suitable service manager or data store, such as described herein. FIG. 4A depicts, in several locations, a symbol including three horizontal lines disposed in a square; the symbol is intended, for simplicity of illustration, to convey that the simplified example construction depicted in FIG. 4B may be suitable in certain embodiments to implement or otherwise construct any of the functional modules, blocks, or other components of the system depicted in FIG. 4A.

Returning to FIG. 4B, the example service manager 402 includes a processor 402a, a memory 402b, and a communication component 402c, each of which may be interconnected and/or communicably or conductively coupled in any suitable manner. As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory, such as the memory 402b. This term is meant to encompass a single processor or processing unit, multiple processors, multiple processing units, analog or digital circuits, or other suitably configured computing element or combination of elements.

The communication component 402c of the example service manager 402 may be a virtual (e.g., application programming interface) or a physical communication interface (e.g., ethernet, Wi-Fi, Bluetooth, and so on).

In view of the foregoing, it may be understood that these descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
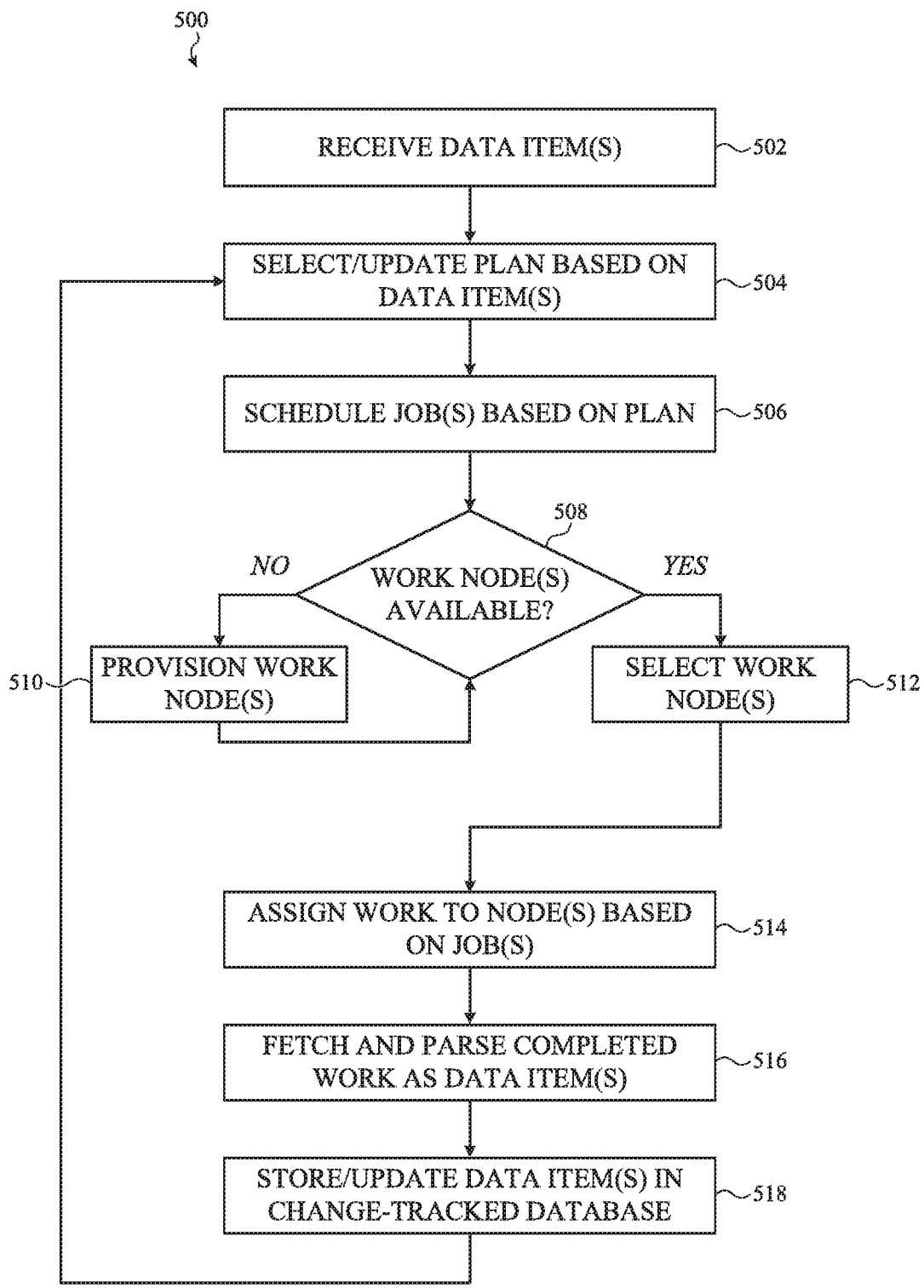
FIG. 5 is a flowchart depicting example operations of a simplified method of assigning and completing work that may be performed in whole or in part by a system, such as described herein.
Figure 11:
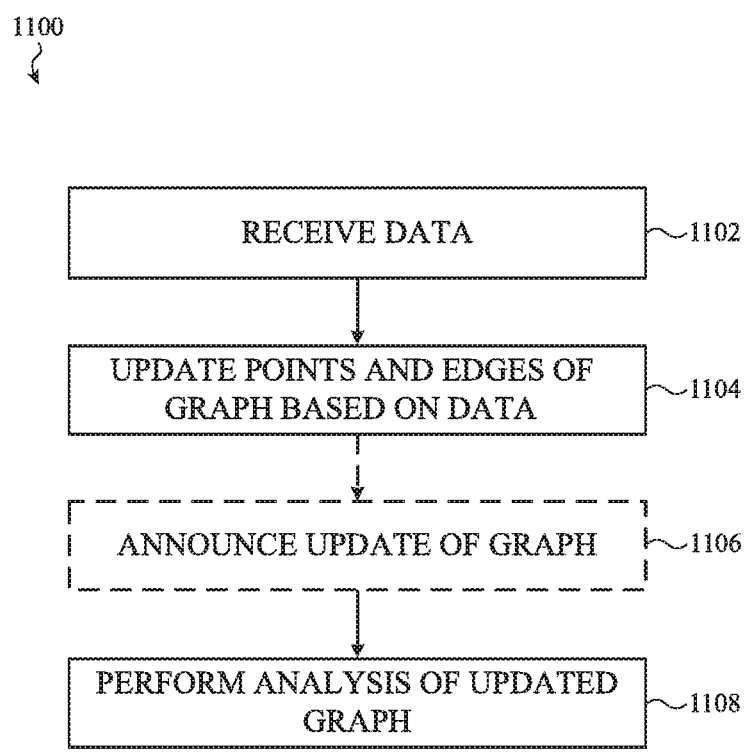
FIG. 11 is a flowchart depicting example operations of a simplified method of analysis that may be performed in whole or in part by a system, such as described herein.

Generally and broadly, FIGS. 5, 11 depict flowcharts showing example operations of methods of using and/or operating a system such as described herein. It may be appreciated that these methods are not exhaustive and that additional or alternative operations or steps may be required or may be suitable in certain implementations.

FIG. 5 is a flowchart depicting example operations of a simplified method of assigning and completing work that may be performed in whole or in part by a system, such as described herein. The method 500 includes operation 502 in which a data item is received by a service manager of a system, such as described herein. A data item is received by an ingest controller service manager, such as described herein.

The method 500 also includes operation 504 in which a plan for advancing a blackbox analysis of a target entity is selected and/or updated based on the received data item. In many examples, the operation 504 can be performed, in whole or in part, by a plan scheduler service manager, such as described herein. In other embodiments, this may not be required; another service manager may be suitable to perform the operation 504, in whole or in part.

The method 500 also includes operation 506 in which a number of jobs are created and/or modified based on the plan selected and/or updated at operation 504. In many examples, the operation 506 can be performed, in whole or in part, by a plan scheduler service manager, such as described herein. In other embodiments, this may not be required; another service manager may be suitable to perform the operation 506, in whole or in part.

The method 500 also includes decision point 508 in which the method determines whether one or more worker nodes are available to perform computational work. In many examples, this operation can be performed, in whole or in part, by a workload manager, such as described herein. In other embodiments, this may not be required; another service manager may be suitable to perform this operation, in whole or in part.

If the decision point 508 determines that no worker nodes are available, the method advances to operation 510 in which a new worker node, or more than one worker node, is created, provisioned, or otherwise instantiated. In many examples, this operation can be performed, in whole or in part, by a node pool controller, such as described herein. In other embodiments, this may not be required; another service manager may be suitable to perform this operation, in whole or in part. After operation 510, the method 500 returns to the decision point 508 or, alternatively, the method 500 terminates.

If the decision point 508 determines that a required minimum number of worker nodes are available, the method advances to operation 512 in one or more worker nodes are or can be selected to perform computational work. In many examples, this operation can be performed, in whole or in part, by a workload manager, such as described herein, although in other embodiments, this may not be required; another service manager may be suitable to perform this operation, in whole or in part.

The method 500 also includes operation 514 in which computational work is assigned to the selected worker node(s). In many examples, the operation 514 can be performed, in whole or in part, by a workload manager or a plan scheduler service manager, such as described herein. In other embodiments, this may not be required; another service manager may be suitable to perform the operation 514, in whole or in part.

The method 500 also includes operation 516 in which completed computational work is fetched and parsed from one or more worker node(s). In many examples, the operation 516 can be performed, in whole or in part, by a workload manager, a plan scheduler service manager, and/or a data ingest service manager, such as described herein. In other embodiments, this may not be required; another service manager may be suitable to perform the operation 516, in whole or in part.

The method 500 also includes operation 518 in which parsed data items are stored in one or more databases. In many examples, the operation 518 can be performed, in whole or in part, by a data enricher service manager such as described herein. In other embodiments, this may not be required; another service manager may be suitable to perform the operation 518, in whole or in part. After operation 518, the method 500 returns to operation 504 or, alternatively, the method 500 terminates.

Figure 6:
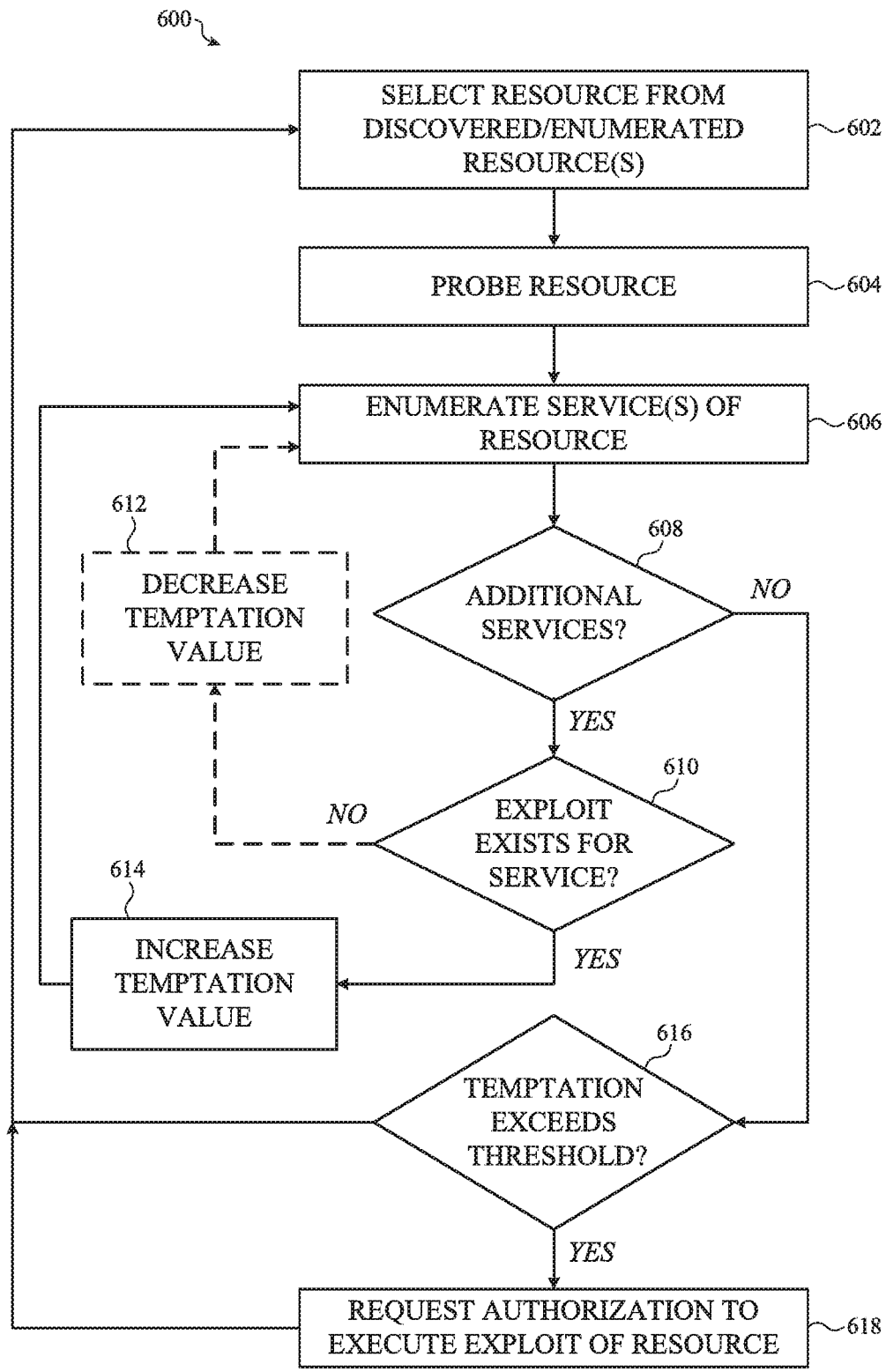
FIG. 6 is a flowchart depicting example operations of a simplified method of determining a computing resource's appeal to the attention of an third party that may be performed in whole or in part by a system, such as described herein.

FIG. 6 is a flowchart depicting example operations of a simplified method of determining a computing resource's appeal or temptation to the attention of an third party that may be performed in whole or in part by a system, such as described herein. In many examples, the method 600 can be performed by a data enricher service manager, such as described herein. In other embodiments, this may not be required and another service manager may be suitable to perform the operations of method 600, in whole or in part.

The method 600 includes operation 602 in which a discovered computing resource is selected. Next, at operation 604, the service discovery operation can be performed, also referred to as probing the discovered computing resource. Next, at operation 606, active and/or responsive services discovered during the service discovery operation are enumerated. Next, at decision point 608, the method 600 determines whether all active services of the computing resource have been examined. If additional active services of the computing resource remain to be examined, the method proceeds to decision point 610 at which the method determines whether an exploit exists for a selected service. If a known exploit does not exist for the service, the method (optionally) advances to operation 612 in which a temptation value or appeal value associated with the discovered computing resource is reduced. After operation 612 the method returns to operation 606.

Alternatively, if a known exploit does exist for the service, the method advances from the decision point 610 to operation 614 in which the temptation value or appeal value associated with the discovered computing resource is increased. After operation 614 the method returns to operation 606 to process the next service among the enumerated services of operation 606.

Once all active services enumerated at operation 606 have been investigated and/or otherwise scored, the method advances to decision point 616 in which the method 600 determines whether the temptation value or appeal value of the discovered computing resource exceeds a threshold. The threshold may be static, may vary from embodiment to embodiment, may be based in part on the discovered computing resource itself, or may be set or determine in any other suitable manner.

If the temptation value of the discovered computing resource does not exceed the threshold of the decision point 616, then the method 600 returns to operation 602. Else, if the temptation value of the discovered computing resource does exceed the threshold of the decision 616, the method 600 advances to operation 618 at which a request for authorization to exploit the discovered computing resource is generated. The request can be forwarded in any suitable manner to any authorized representative of an entity in control of, or otherwise administering, the discovered computing resource. In other cases, the operation 618 may be optional; the system may endeavor to exploit the discovered computing resource autonomously. After operation 618, the method 600 returns to operation 602 or, alternatively, the method 600 terminates.

Figure 7:
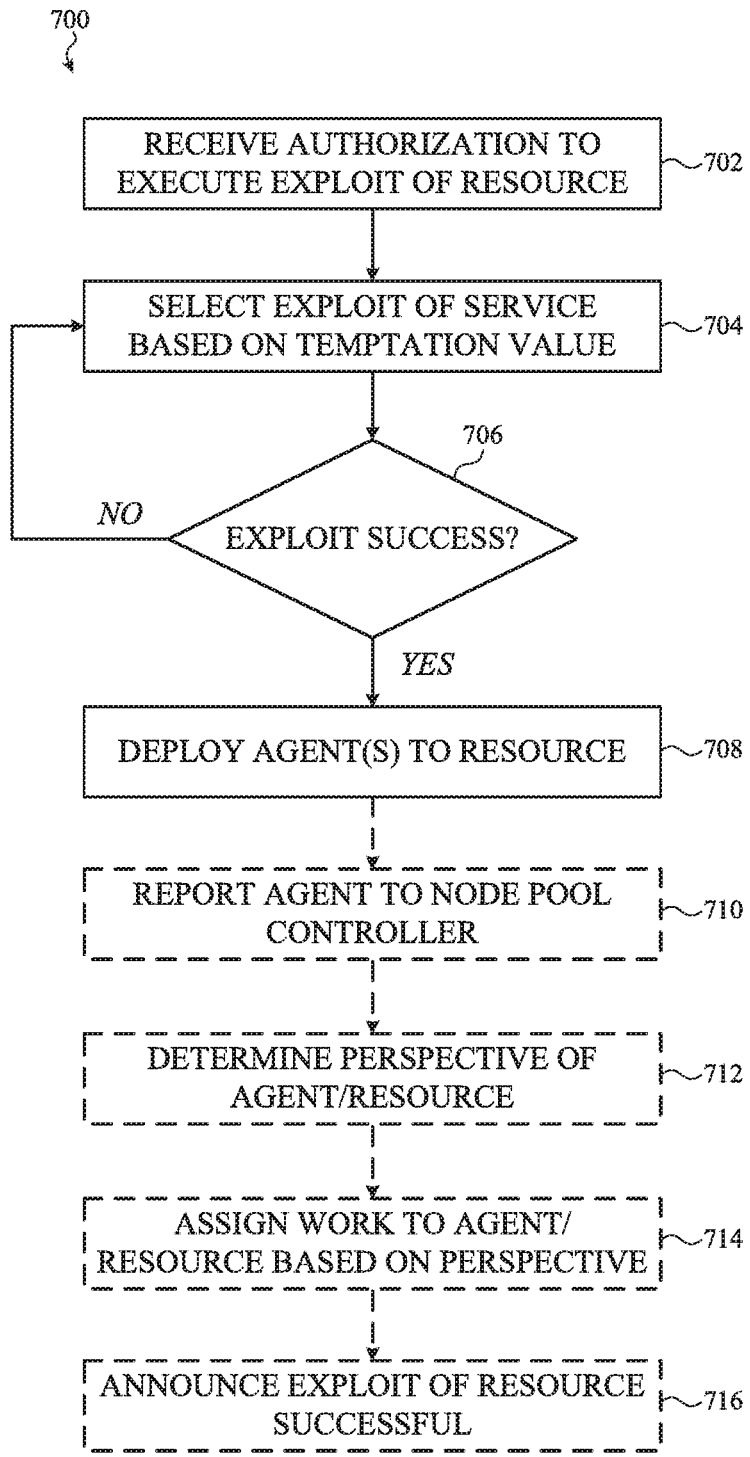
FIG. 7 is a flowchart depicting example operations of a simplified method of deploying an exploit to a computing resource that may be performed in whole or in part by a system, such as described herein.

FIG. 7 is a flowchart depicting example operations of a simplified method of deploying an exploit to a computing resource that may be performed in whole or in part by a system, such as described herein. The method 700 include the operation 702 of receiving an authorization to execute an exploit of a discovered computing resource. Next, at operation 704, an exploit is selected based on a previous analysis (e.g., by a data ingester or a data enricher, such as described herein) of which exploits, or groups of exploits, may be suitable to compromise a given computing resource. In some cases, multiple exploits may be ranked and/or sorted based on a likelihood of success. For example, as noted above, a computing resource may host multiple services, each of which may include one or more vulnerabilities that may be exploited.

The method 700 includes decision point 706 in which the exploit selected at operation 704 is deployed. If the deployment of the selected exploit is unsuccessful, the method 700 returns to operation 704. Alternatively, if the exploit is successful, the method 700 advances to operation 708 in which an agent, such as described above, is deployed to the compromised computing resource.

Next, at optional operation 710, the agent and/or the compromised computing resource hosting the agent can report as an available worker node to a node pool controller and/or to a workload manager, such as described herein. Next, at optional operation 712, a perspective of the agent and/or the compromised computing resource can be determined. For example, it may be determined whether the agent and/or the compromised computing resource is able to communicate with one or more previously-unknown computing resources, whether the agent and/or the compromised computing resource is able to enumerate a previously-unknown network of computing devices, and so on.

Next, at optional operation 714, one or more assignments of computational work can be given to the agent and/or the compromised computing resource. The work may be related to an entity reconnaissance operation, a resource discovery operation, a service discovery operation, an exploitation operation, a mining operation, or a perspective pivot operation. Finally, at optional operation 716, the method 700 may cause to be announced that an exploit of the discovered computing resource was successful.

Figure 8:
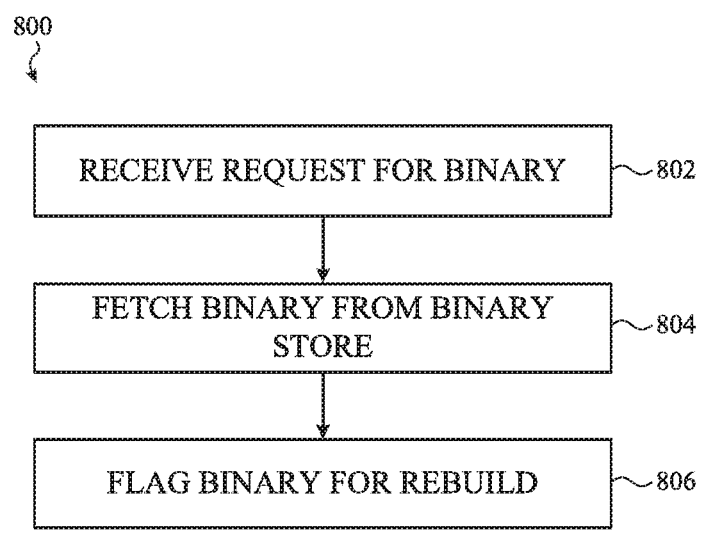
FIG. 8 is a flowchart depicting example operations of a simplified method of mitigating effects of forensic analysis of a binary deployed to exploit to a computing resource that may be performed in whole or in part by a system, such as described herein.

FIG. 8 is a flowchart depicting example operations of a simplified method of mitigating effects of forensic analysis of a binary deployed to exploit to a computing resource that may be performed in whole or in part by a system, such as described herein. the method 800 includes the operation 802 in which a request for a compiled binary file is received. The binary file may be an agent, an exploit, or a data item such as described herein. In other cases, another type of binary file may be requested. Next at operation 804, the binary file is fetched from a binary file store. Alternatively, the binary file may be created (e.g., compiled) from source code or from a source file. Finally, at operation 806, the binary file stored in the database may be flagged for rebuild or recompilation at a later time.

Figure 9:
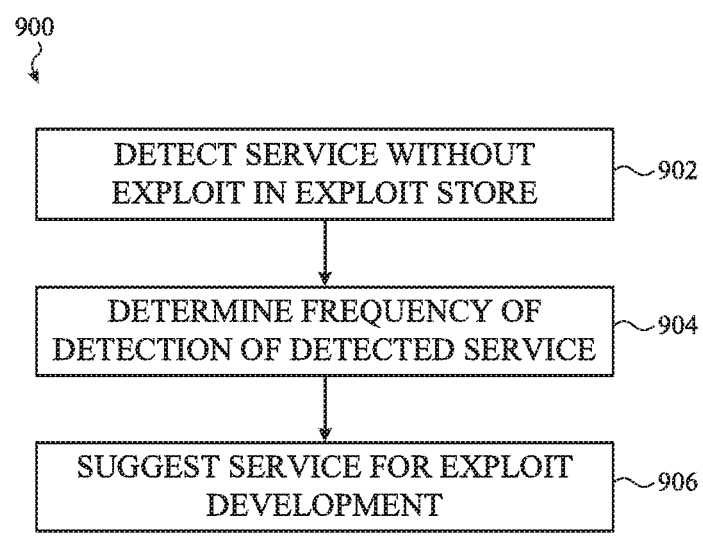
FIG. 9 is a flowchart depicting example operations of a simplified method of identifying a potentially exploitable service that may be performed in whole or in part by a system, such as described herein.

FIG. 9 is a flowchart depicting example operations of a simplified method of identifying a potentially exploitable service that may be performed in whole or in part by a system, such as described herein. The method 900 includes operation 902 in which a service is detected for which an implemented exploit does not exist. Next, at operation 904, the method determines a frequency with which the service of operation 902 has been detected. Finally, at operation 906, if the frequency determined at operation 904 exceeds or otherwise crosses a predetermined threshold, a report can be made to suggest development attention to researching an exploit for the detected service.

Figure 10:
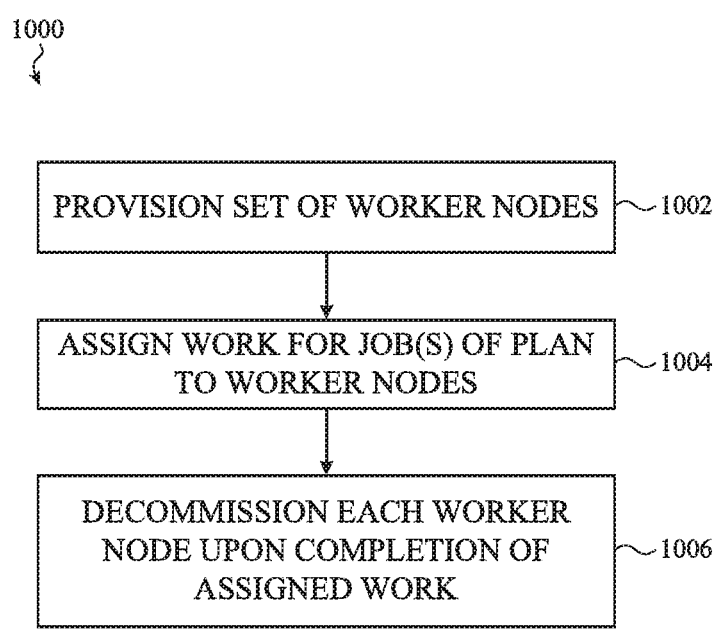
FIG. 10 is a flowchart depicting example operations of a simplified method of assigning and completing work that may be performed in whole or in part by a system, such as described herein.

FIG. 10 is a flowchart depicting example operations of a simplified method of assigning and completing work that may be performed in whole or in part by a system, such as described herein. The method 1000 includes operation 1002 in which a set of worker nodes are provisioned. At operation 1004, the set of newly provisioned worker nodes are assigned computational work associated with one or more jobs in turn associated with one or more plans. Finally, at operation 1006, after assigned work as been completed by each of the worker nodes, each of the worker nodes is decommissioned and/or otherwise discarded.

FIG. 11 is a flowchart depicting example operations of a simplified method of analysis that may be performed in whole or in part by a system, such as described herein. The method 1100 includes operation 1102 in which data is received. Thereafter, at operation 1004, one or more points or edges of a mathematical graph can be updated based on the data. Next, optionally, at operation 1106, an announcement can be made that a graph has been updated. Finally, at operation 1108, analysis can be performed on the updated graph. Example analysis that can be performed can include, but may not be limited to: updating confidence scores or values of edges or points; updating appeal or temptation values associated with one or more points; and so on.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A distributed system for remote discovery and remote evaluation of a vulnerability presented by an instance of software executed by a computing resource, the distributed system comprising: a workload manager configured to: receive, as input, a data item associated with an entity; and generate a reconnaissance plan based on the data item, the reconnaissance plan comprising a set of jobs, each job defining at least one computational task; a pool of worker node instances, each worker node instance configured to receive one respective job of the set of jobs and to execute each respective computational task defined by the one respective job, thereby generating data; a data aggregator configured to receive, and to aggregate, data resulting from execution of one or more jobs of the set of jobs by one or more worker nodes, thereby generating aggregated data; and a data processor configured to receive the aggregated data with which the data processor is configured to: identify at least one computing resource likely administered by the entity and, for each respective computing resource: identify an instance of software executed by the computing resource; identify a vulnerability presented by the instance of software; and generate or update an appeal score based at least in part on the vulnerability, the appeal score corresponding to a prediction of attractiveness of the respective computing resource to an exploitation attempt by a third party.

2. The system of claim 1, wherein the data item is received from a client application executing on a client device communicably coupled to the system.

3. The system of claim 1, wherein the data item comprises one or more of: a hostname associated with the entity; an email address associated with the entity; a physical address associated with the entity; a telephone number associated with the entity; or a name of the entity.

4. The system of claim 1, wherein the workload manager is configured to update the reconnaissance plan based on one or more of: at least one appeal score; or at least one identified vulnerability.

5. The system of claim 4, wherein: the reconnaissance plan is updated based on at least one identified vulnerability score; and the updated reconnaissance plan comprises an exploit job configured to exploit the at least one vulnerability.

6. The system of claim 5, wherein at least one of the pool of worker node instances executes the exploit job, thereby targeting the respective computing resource.

7. The system of claim 6, wherein the exploit job comprises execution of a precompiled exploit.

8. The system of claim 6, wherein, upon successful execution of the exploit job, the workload manager is configured to add the exploited computing resource as a new worker node instance to the pool of worker node instances.

9. The system of claim 1, wherein the pool of worker node instances is geographically distributed such that a first portion of the worker nodes are instantiated in a first jurisdiction and a second portion of the worker nodes are instantiated in a second jurisdiction.

10. A method for remote discovery and evaluation of Internet-connected computing resources administered by an entity, the method comprising: receiving, as input, a data item associated with the entity; generating a reconnaissance plan based on the data item, the reconnaissance plan comprising a set of jobs, each job defining at least one computational task; and iteratively or recursively: assigning each respective job to a respective ephemeral worker node; and aggregating data resulting from execution of each respective job, and with the aggregated data: identifying a computing resource likely administered by the entity; identifying an instance of software executed by the computing resource; identifying a vulnerability presented by the instance of software; and updating an appeal score of the computing resource, the appeal score corresponding to a likelihood of an exploitation attempt by a third party; and updating the reconnaissance plan based on the appeal score.

11. The method of claim 10, wherein at least one ephemeral worker node is decommissioned upon successful execution of its respective assigned job.

12. The method of claim 10, wherein the appeal score is determined, at least in part, based on a selected sophistication of the third party.

13. The method of claim 10, wherein aggregating data resulting from execution of each respective job comprises storing data exfiltrated from a computing resource.

14. The method of claim 10, wherein the appeal score of the computing resource is based, at least in part, on the exfiltrated data.

15. The method of claim 10, wherein the data item comprises one or more of: a hostname associated with the entity; an email address associated with the entity; a physical address associated with the entity; a telephone number associated with the entity; or a name of the entity.

16. The method of claim 10, further comprising with the aggregated data: identifying an exploit to the vulnerability; and executing the exploit to compromise the computing resource.

17. The method of claim 16, wherein the reconnaissance plan is updated, at least in part, based on the compromised computing resource.

18. A method for presenting and ranking results of a remote discovery and evaluation operation enumerating computing resources of an entity, the method comprising: receiving, at a user interface, a data item identifying the entity; generating a reconnaissance plan comprising a set of jobs selected based on the data item; iteratively or recursively: assigning each respective job of the set of jobs to a respective worker node selected from a pool of geographically distributed instantiated worker nodes; and receiving data resulting from each execution of each respective job, and with the received data: identifying a computing resource likely administered by the entity; identifying an instance of software executed by the computing resource; identifying a vulnerability presented by the instance of software; and updating or creating an appeal score of the computing resource, the appeal score corresponding to a prediction of attractiveness of the computing resource and vulnerability to an exploitation attempt by a third party; updating the reconnaissance plan based on the appeal score; and updating the user interface to display information related to at least a subset of identified computing resources, in descending order of appeal score.

19. The method of claim 18, wherein, for each respective computing resource of the subset of identified computing resources displayed by the user interface, additionally displaying information related to at least one of: the respective software instance; or the respective vulnerability.

20. The method of claim 18, comprising, with the received data: executing an exploit of the vulnerability to compromise the computing resource; and updating the user interface to display information related to the executed exploit.

\* \* \* \* \*